O. C. EDWARDS, Jr.
CAISSON.
APPLICATION FILED MAY 29, 1908.
1,025,614.
Patented May 7, 1912.
17 SHEETS—SHEET 2.
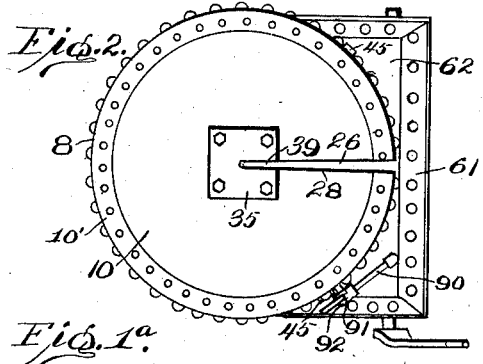
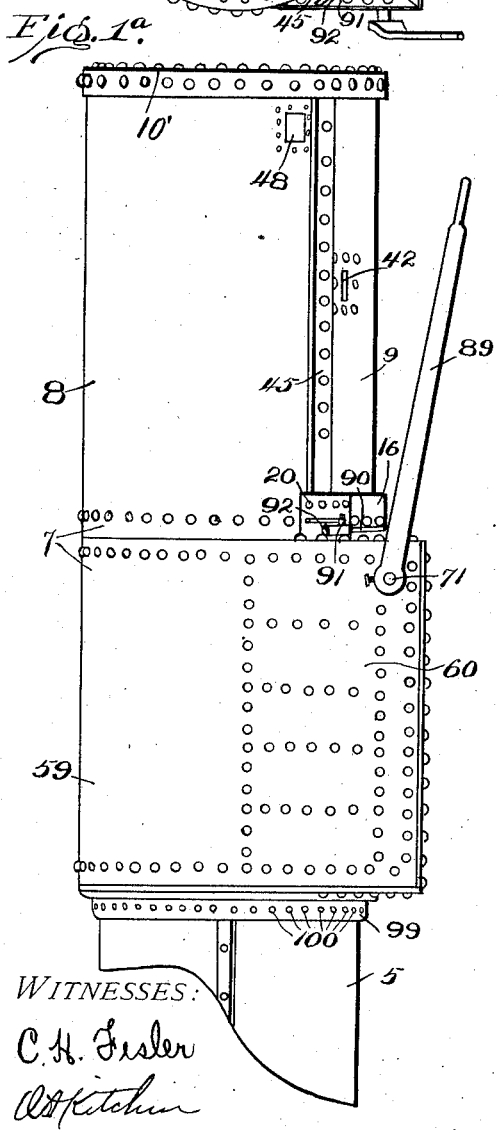
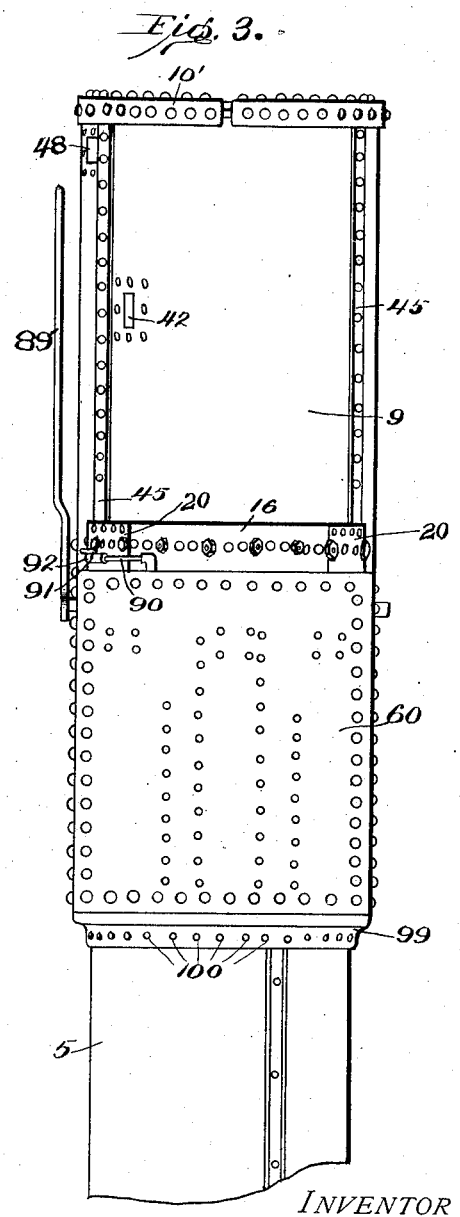

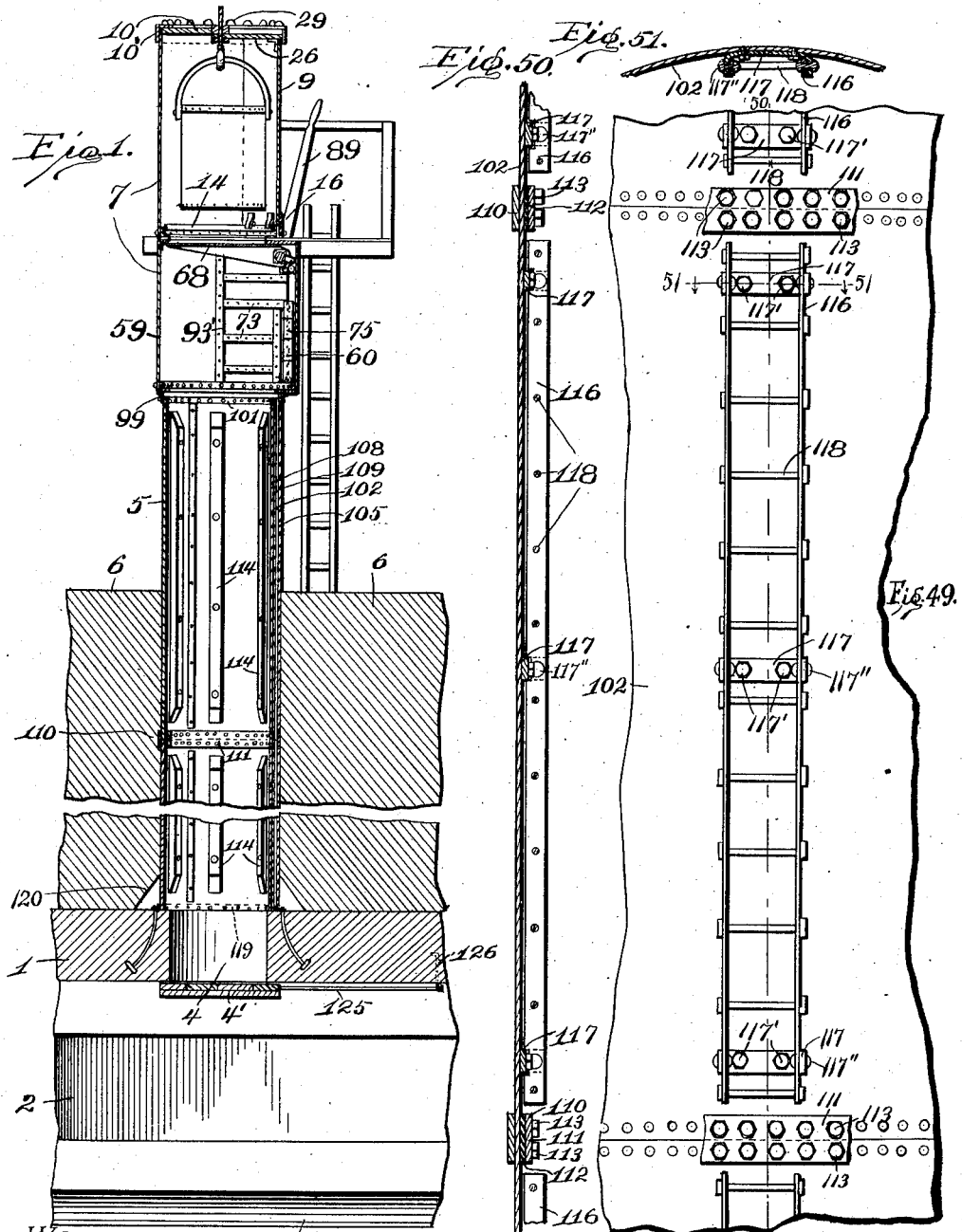

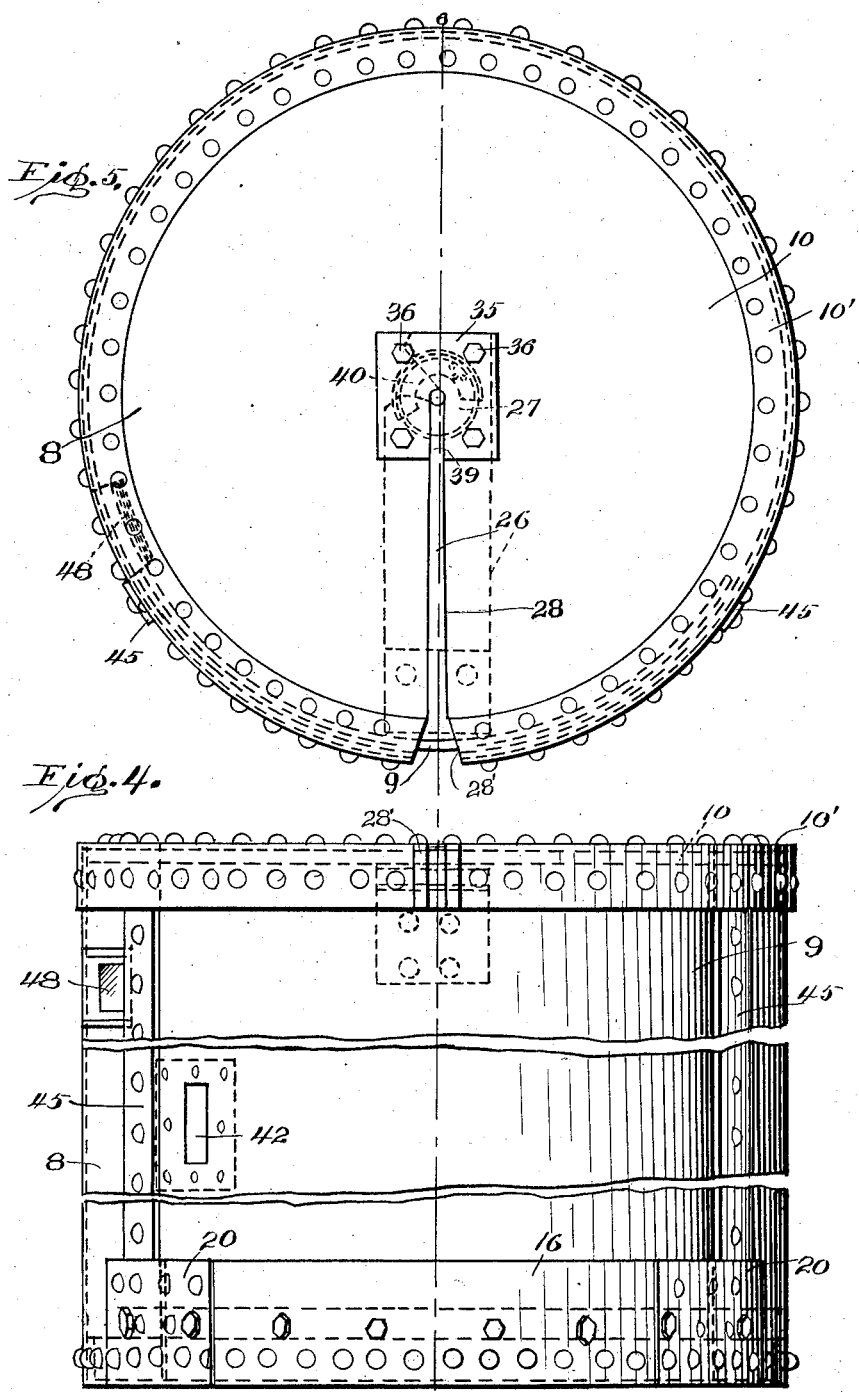

O. C. EDWARDS, Jr.
CAISSON.
APPLICATION FILED MAY 29, 1908.

1,025,614.

Patented May 7, 1912.
17 SHEETS—SHEET 4.

WITNESSES:
C. H. Fesler
O. A. Kitchin

INVENTOR
Oliver C. Edwards, Jr.
BY
Edgar M. Kitchin
his Attorney.

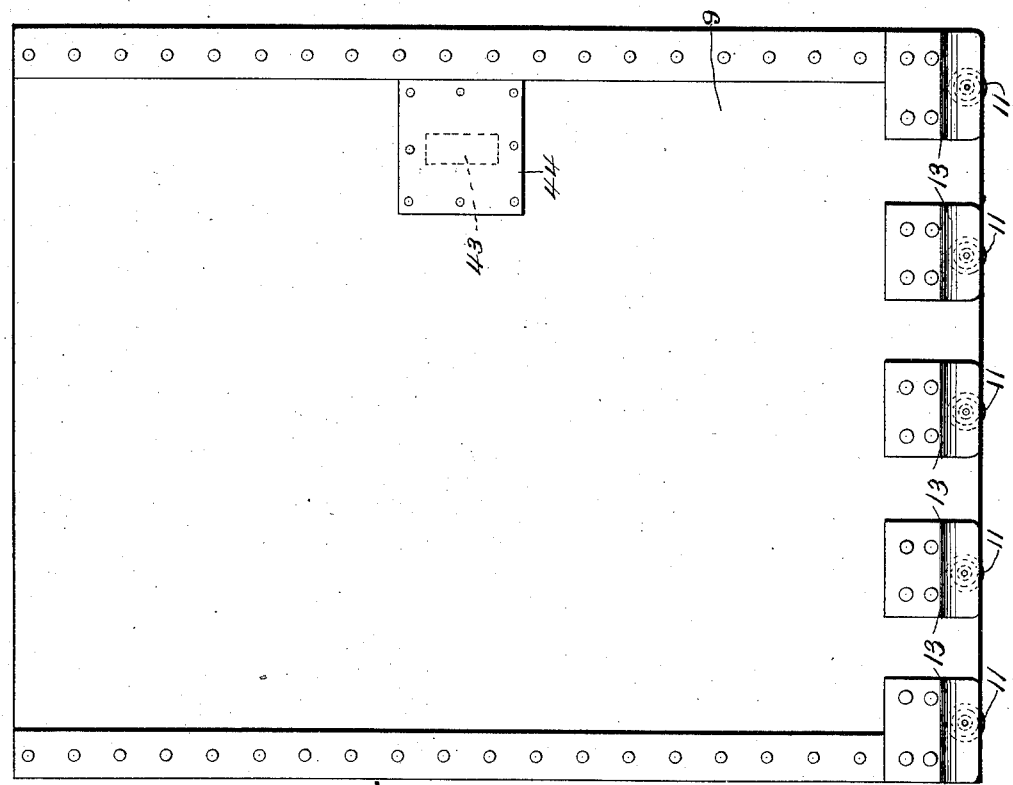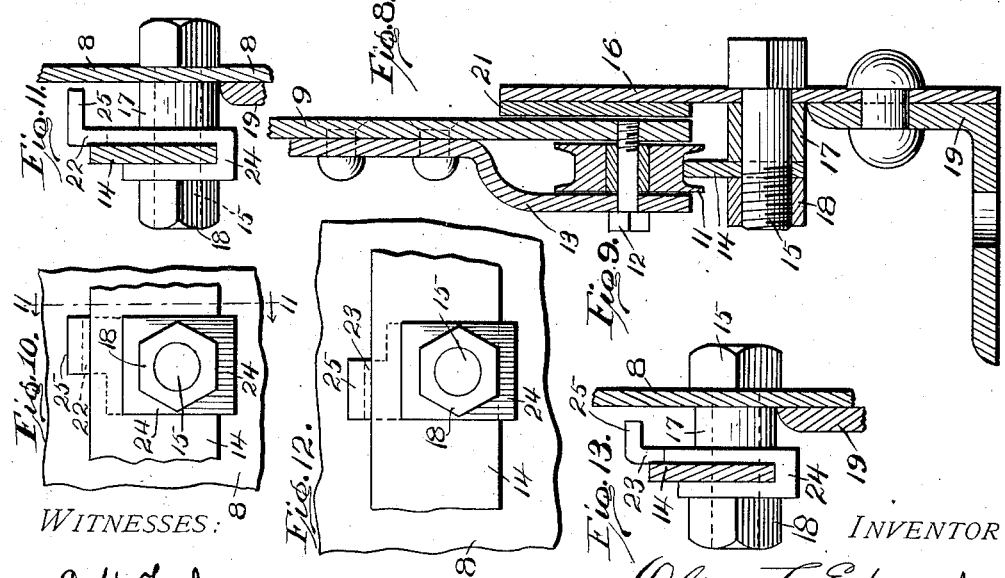

O. C. EDWARDS, Jr.
CAISSON.
APPLICATION FILED MAY 29, 1908.
1,025,614.
Patented May 7, 1912.
17 SHEETS—SHEET 6.
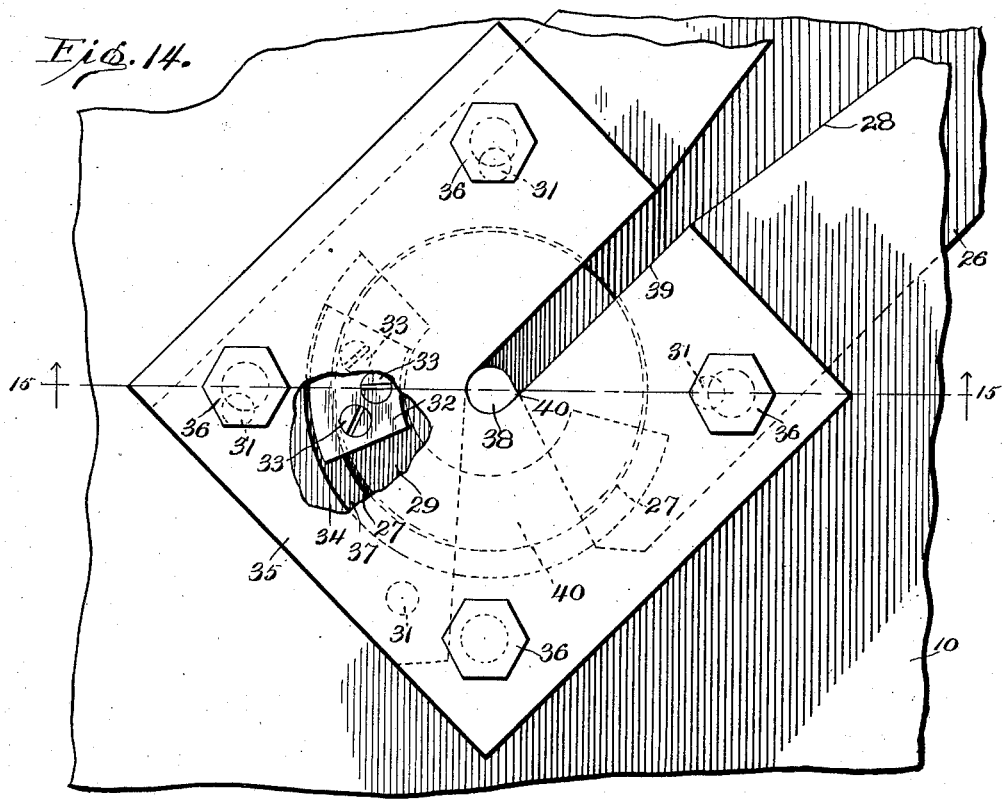
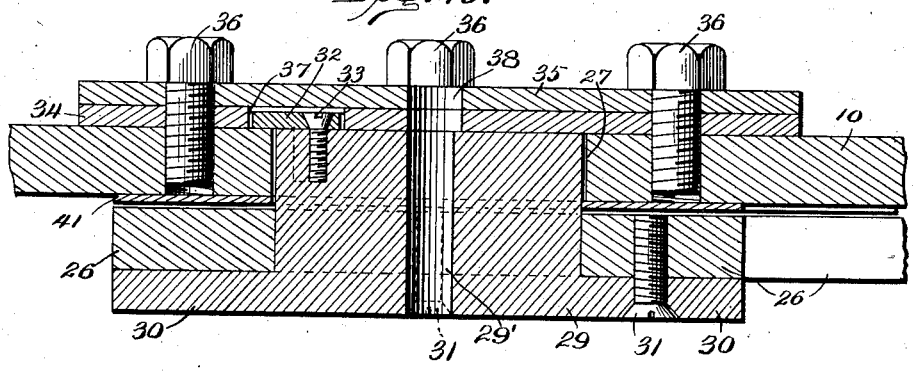

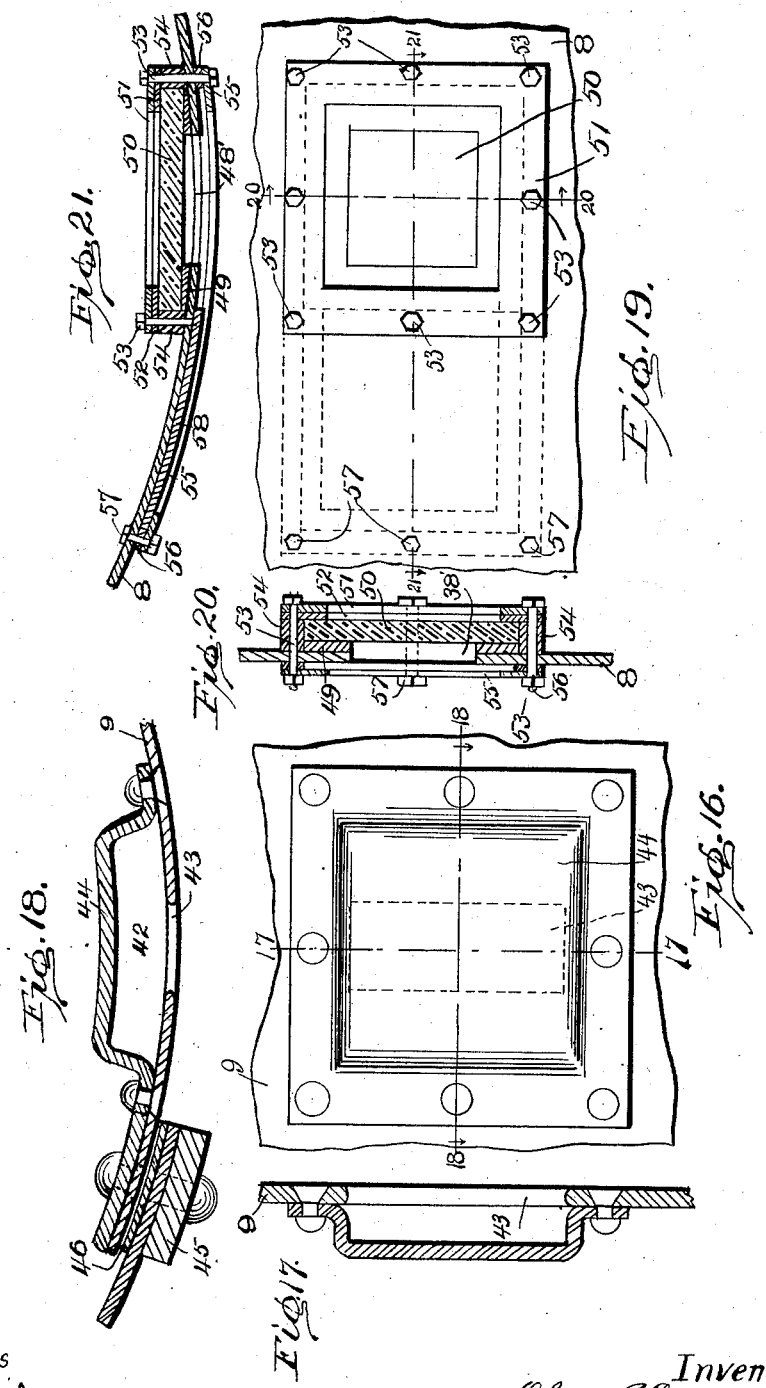

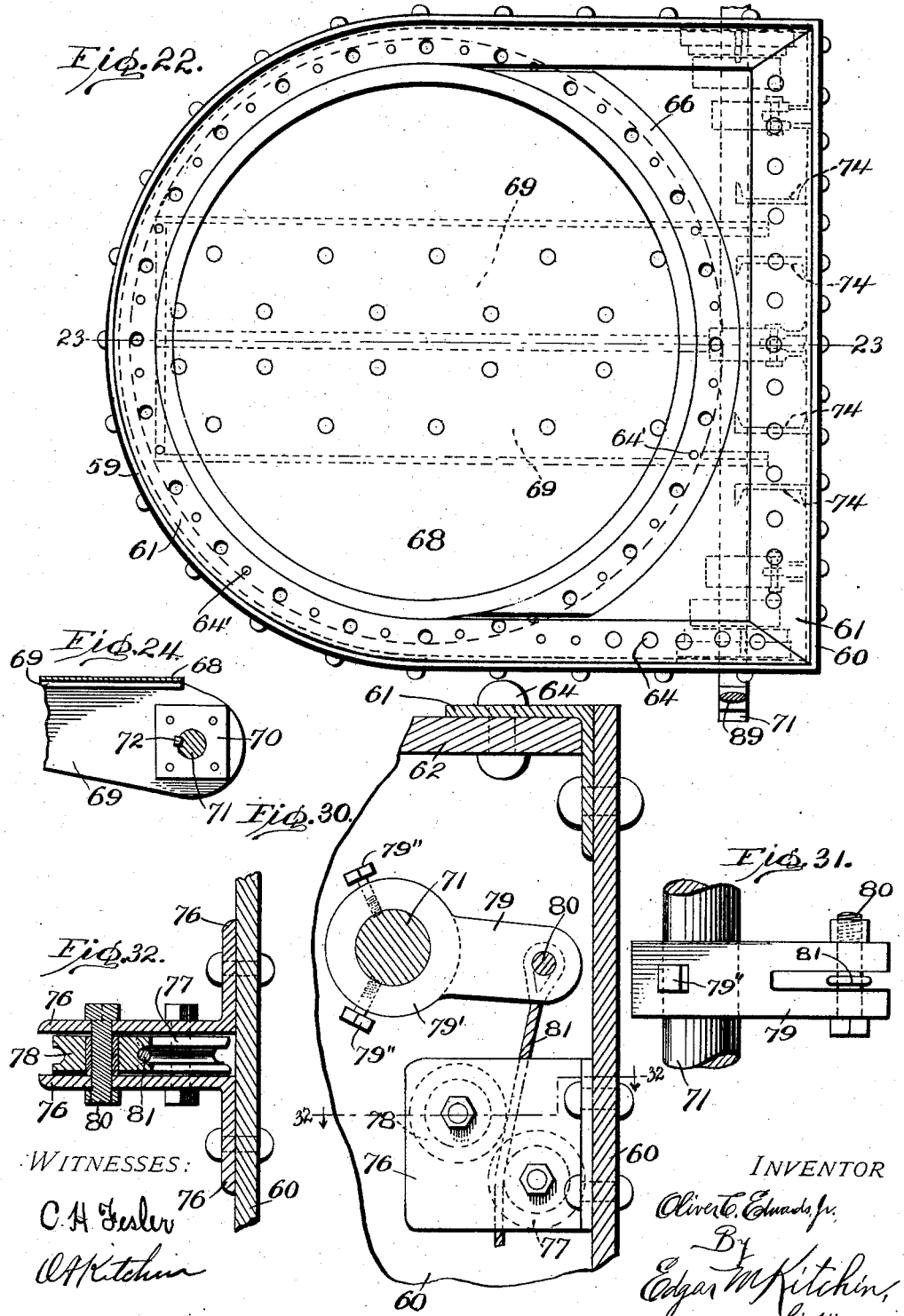

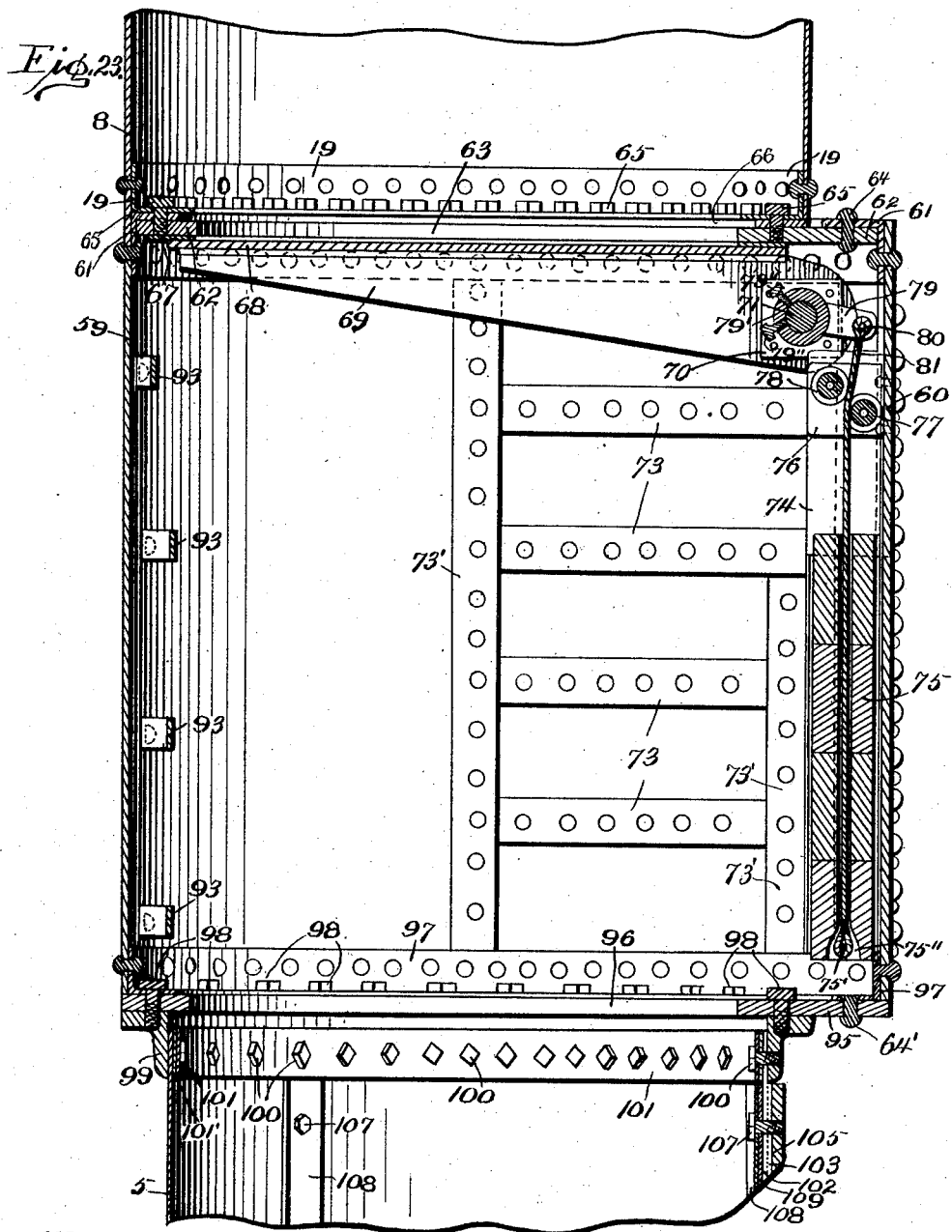

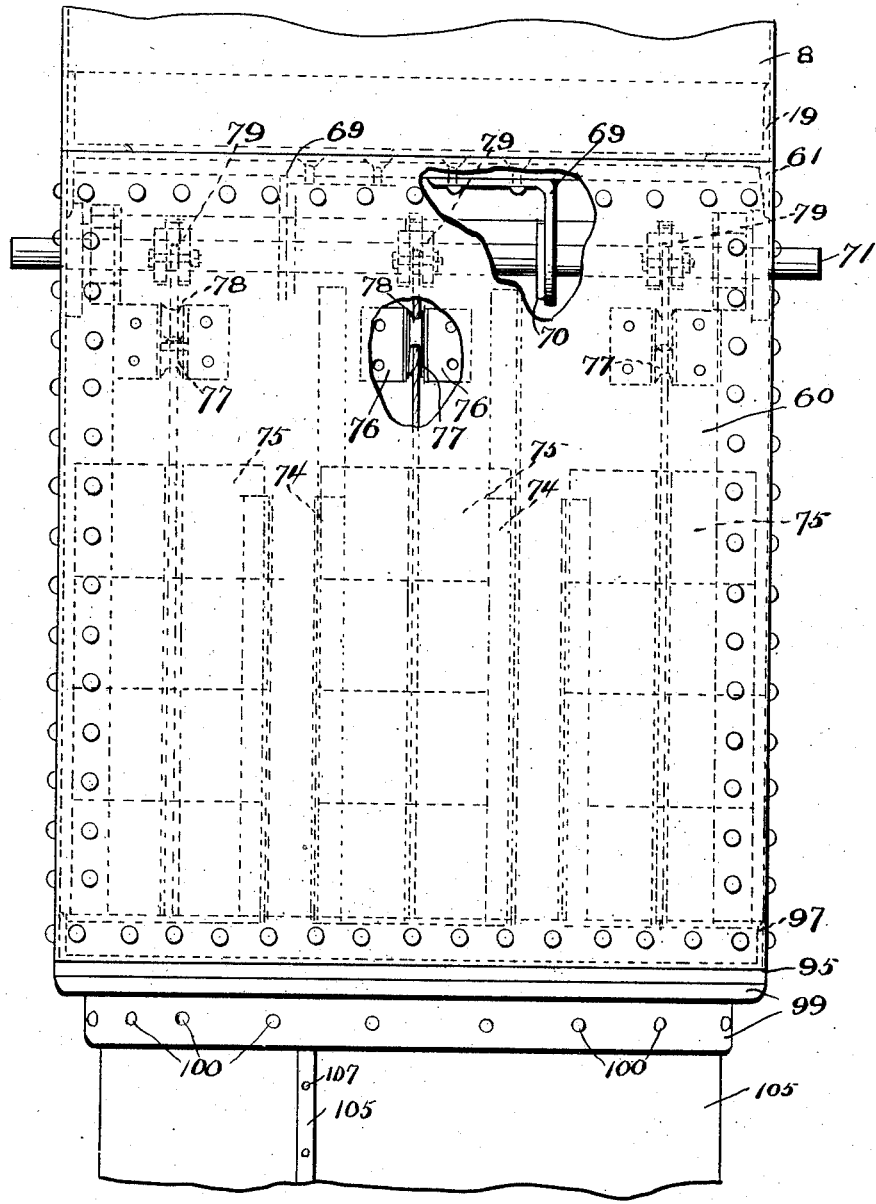

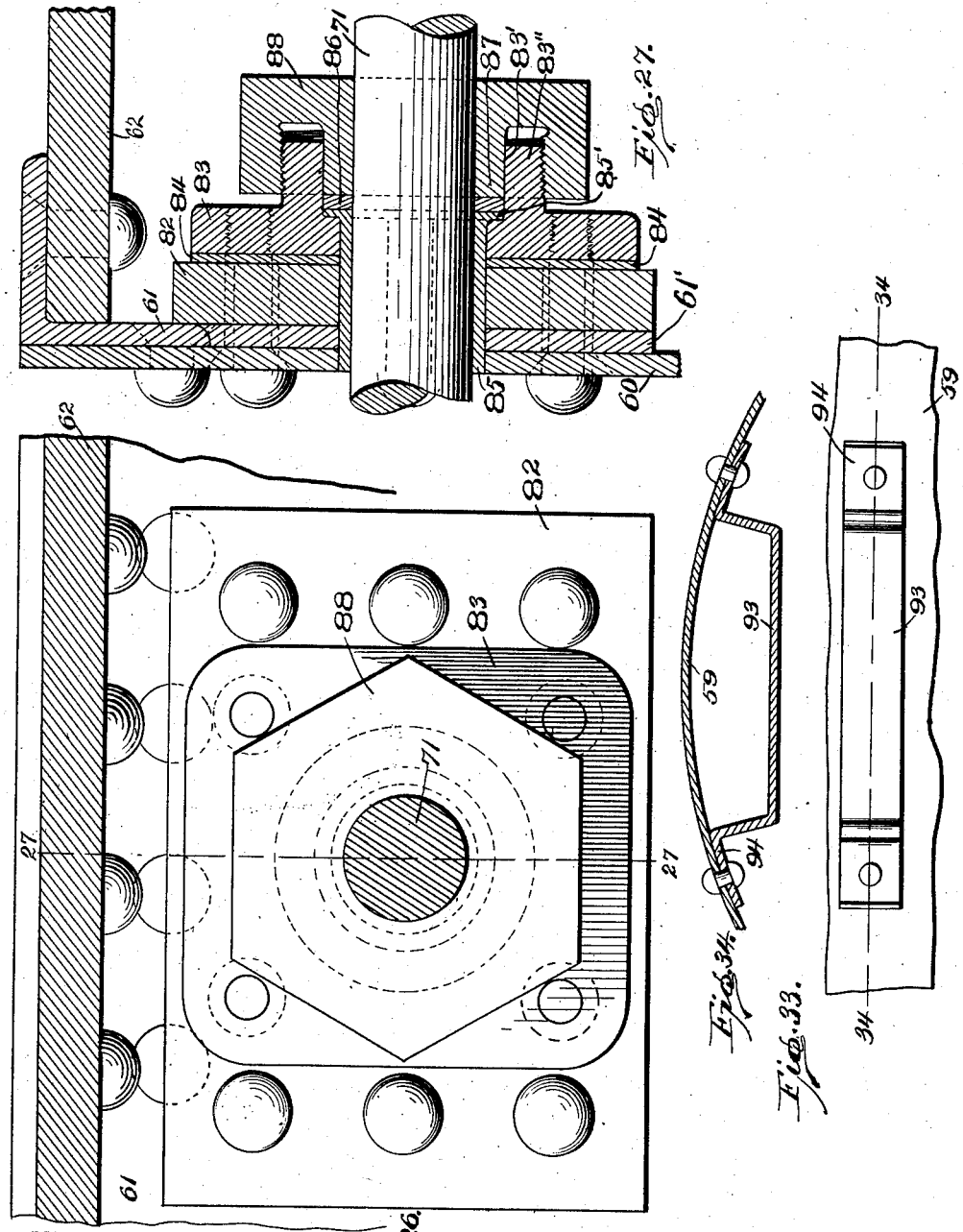

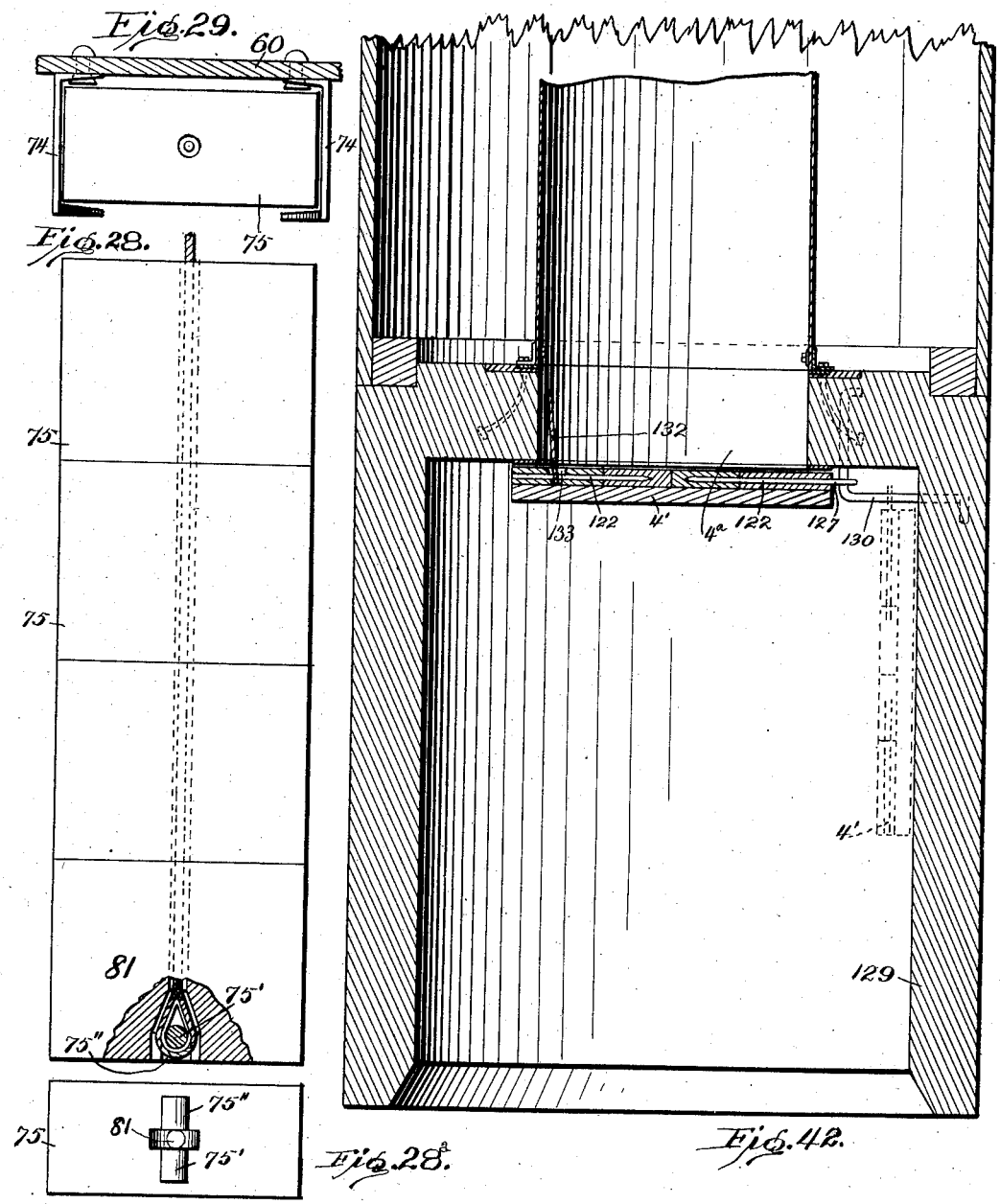

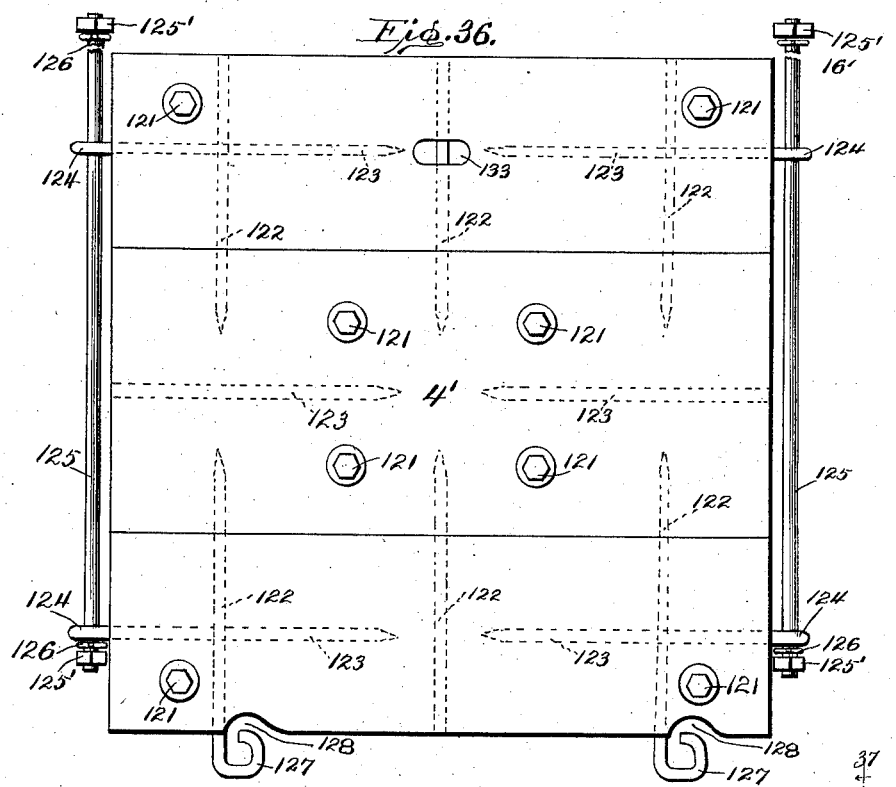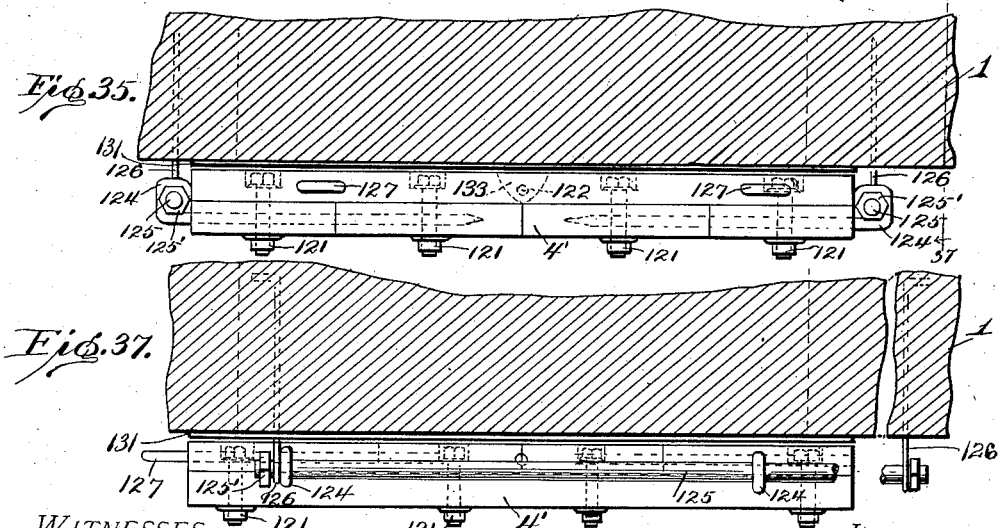

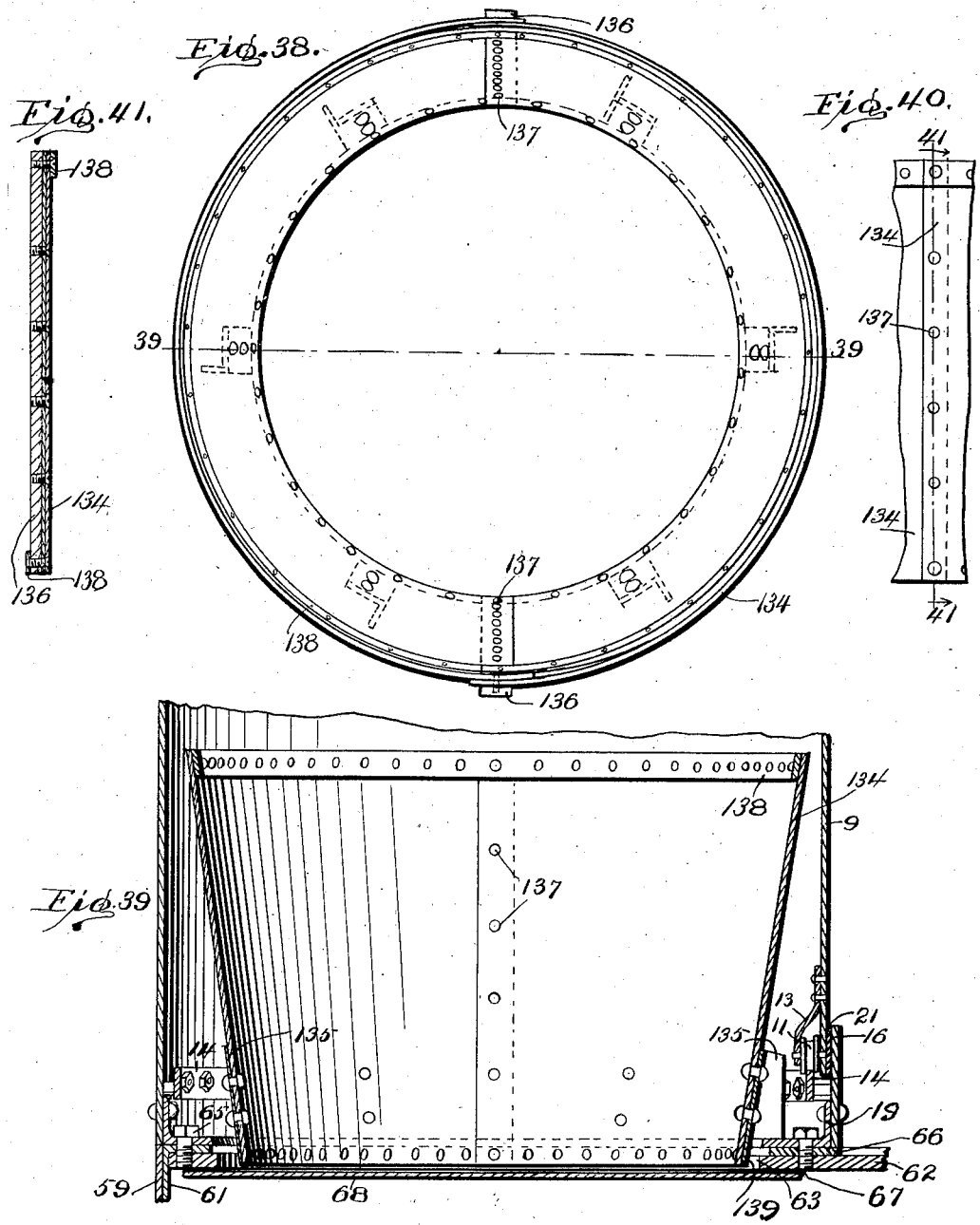

O. C. EDWARDS, Jr.
CAISSON.
APPLICATION FILED MAY 29, 1908.
1,025,614.
Patented May 7, 1912.
17 SHEETS—SHEET 15.
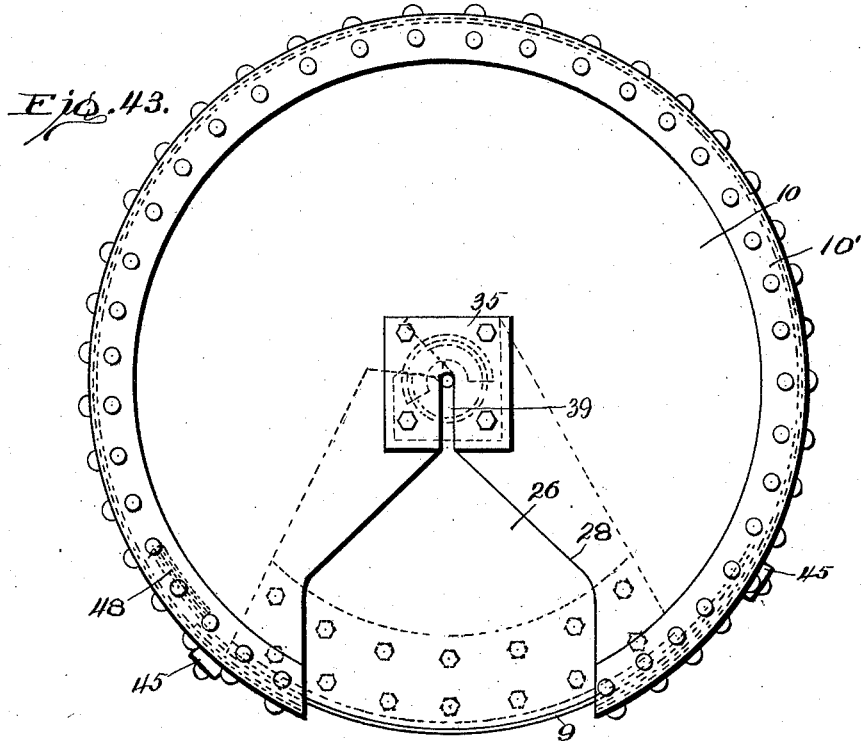
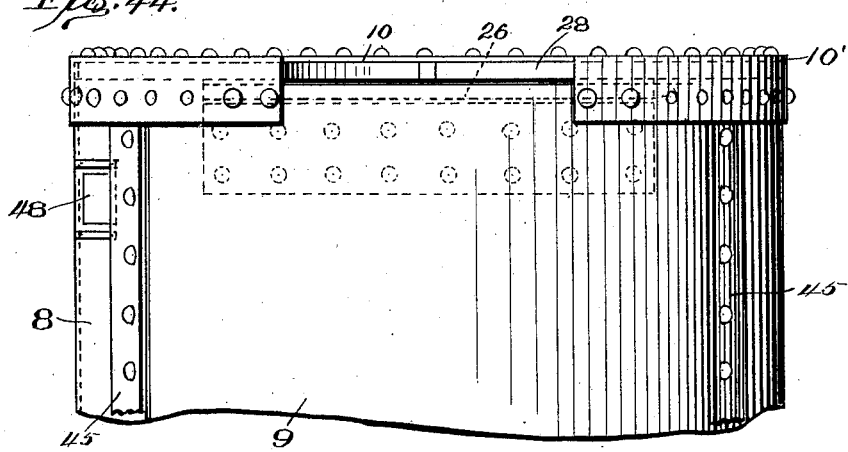
WITNESSES:
C. H. Fesler
A. Kitchin
INVENTOR
Oliver C. Edwards, Jr.,
BY Edgar M. Kitchin,
his Attorney.

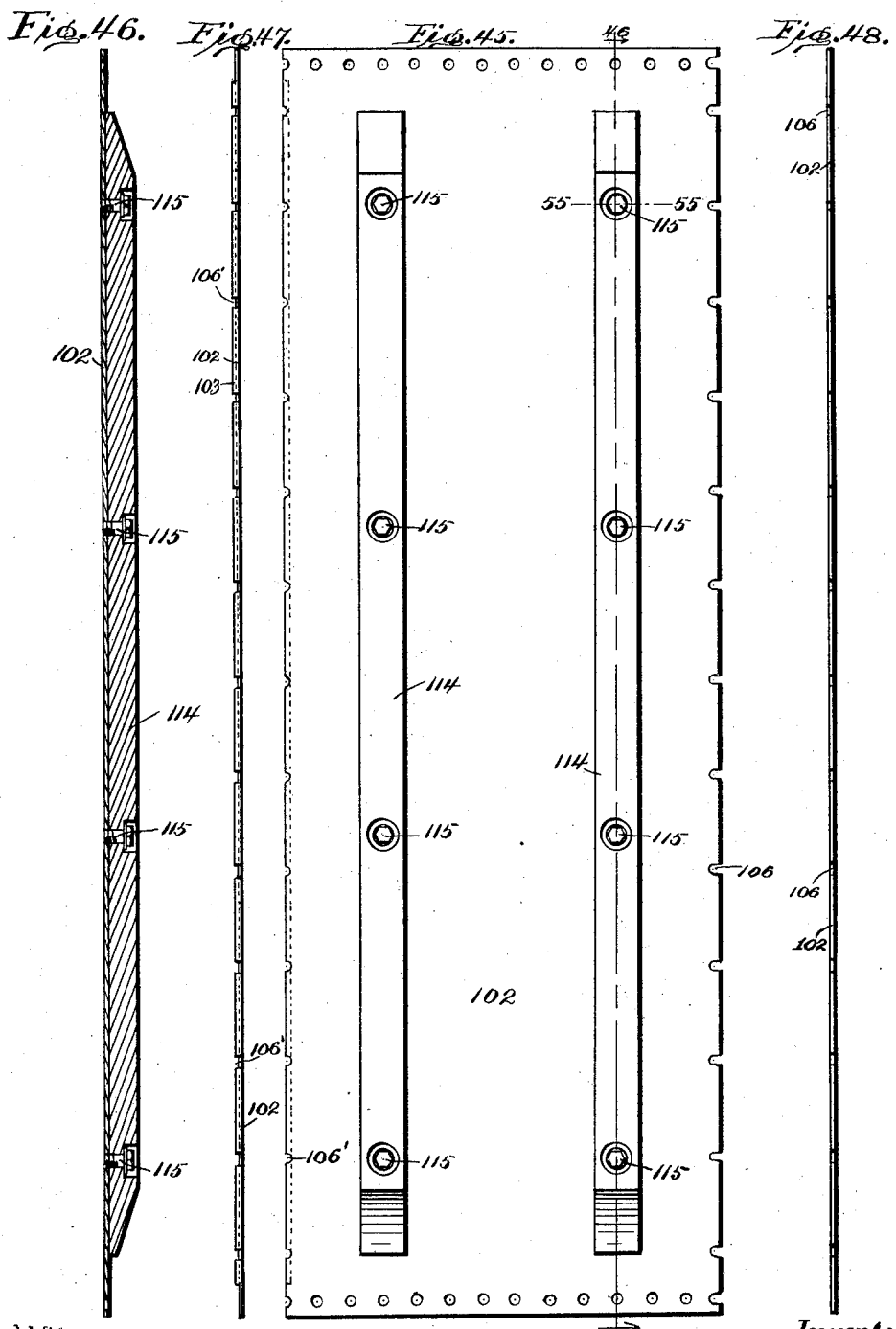

O. C. EDWARDS, Jr.
CAISSON.
APPLICATION FILED MAY 29, 1908.
1,025,614.
Patented May 7, 1912.
17 SHEETS—SHEET 17.
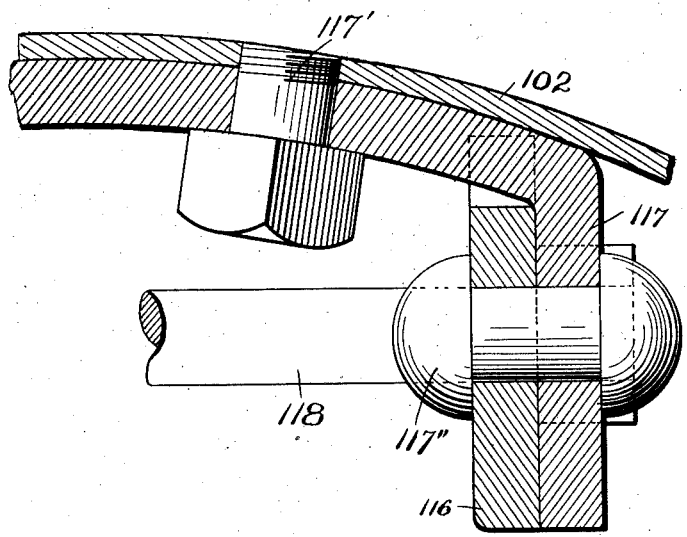
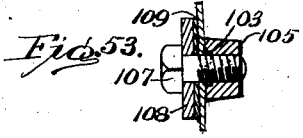
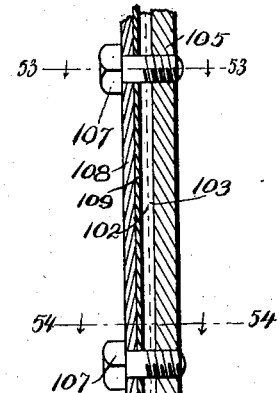
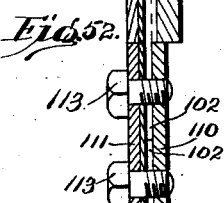
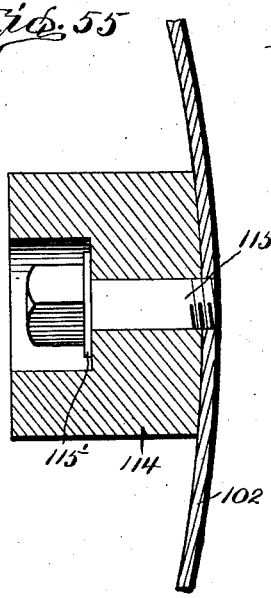
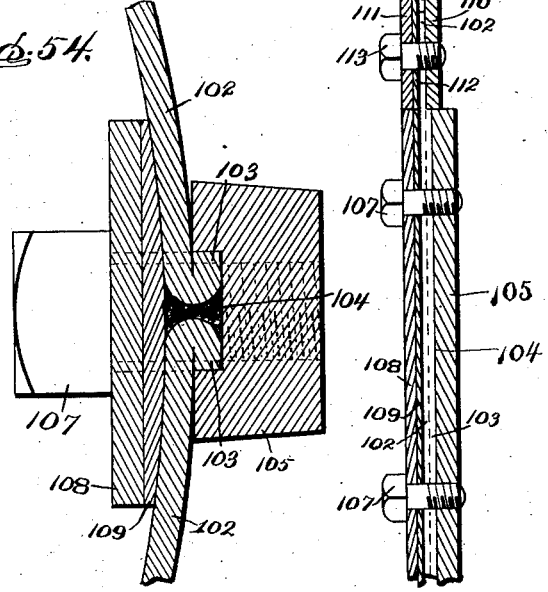
WITNESSES:
C. H. Fesler
A. Kitchin
INVENTOR
Oliver C. Edwards, Jr.
BY Edgar M. Kitchin,
his Attorney.

UNITED STATES PATENT OFFICE.

OLIVER CROMWELL EDWARDS, JR., OF TROY, NEW YORK.

CAISSON.

1,025,614.  Specification of Letters Patent.  Patented May 7, 1912.

Application filed May 29, 1908. Serial No. 435,775.

*To all whom it may concern:*

Be it known that I, OLIVER C. EDWARDS, Jr., C. E., a citizen of the United States, residing at Troy, in the county of Rensselaer and State of New York, have invented certain new and useful Improvements in Caissons; and I do hereby declare the following to be a full, clear, and exact description of the invention, such as will enable others skilled in the art to which it appertains to make and use the same.

This invention relates to improvements in air shafts and locks therefor, and particularly to the type designed both for man and spoil use, and one of the objects in view is the accommodation of a maximum intake in a minimum space, and the facilitating of removal of the parts of the shaft from surrounding masonry.

A further object in view is the operation and control of the several parts of the lock by a single lock tender positioned on the outside of the lock.

With these and further objects in view, the invention comprises certain novel constructions, combinations and arrangements of parts as will be hereinafter fully described and claimed.

In the accompanying drawings:—Figure 1 is a longitudinal, vertical, central section of an air lock and shaft embodying the features of the present invention. Fig. 1ª is a view in elevation of the lock and upper end of the shaft. Fig. 2 is a top plan view thereof. Fig. 3 is a similar view to Fig. 1ª taken at right angles to the planes of observation in said figure. Fig. 4 is a view similar to Fig. 3 of the upper section of the lock seen on an enlarged scale and intermediate parts being broken away. Fig. 5 is a top plan view thereof. Fig. 6 is a longitudinal, vertical section taken on the plane indicated by line 6, 6 of Figs. 4 and 5, and line 6, 6 of Fig. 7, intermediate portions being broken away. Fig. 7 is a horizontal section taken on the plane indicated by line 7, 7 of Fig. 6 looking downwardly. Fig. 8 is a view in side elevation of the upper section door detached looking at the inner surface of the door, with curve undeveloped. Fig. 9 is an enlarged, detail, vertical section through one of the rollers of the upper section door and surrounding parts. Fig. 10 is a detail fragment of the rail for said rollers showing the fore stop for the door in elevation. Fig. 11 is a vertical section taken on the plane indicated by line 11, 11 of Fig. 10. Fig. 12 is a view similar to Fig. 10 of the back stop of the door. Fig. 13 is a view similar to Fig. 11 of the said back stop. Fig. 14 is an enlarged, detail, top plan view of the hinge plate for the upper section door, parts being broken away for indicating contiguous parts. Fig. 15 is a vertical section taken on the plane indicated by line 15, 15 of Fig. 14. Fig. 16 is a view in elevation on an enlarged scale of the hand hold for the upper section door looking at the inside. Fig. 17 is a vertical section therethrough taken on the plane indicated by line 17, 17 of Fig. 16. Fig. 18 is a horizontal section taken on the plane indicated by line 18, 18 of Fig. 16, a fragment of the contiguous portion of the shell being shown. Fig. 19 is a view in elevation of the mounting for the peep hole showing a fragment of the shell of the upper section. Fig. 20 is a vertical section taken on the plane indicated by line 20, 20 of Fig. 19. Fig. 21 is a horizontal section taken on the plane indicated by line 21, 21 of Fig. 19. Fig. 22 is a top plan view of the lower section with the upper section removed. Fig. 23 is a section therethrough taken on the plane indicated by line 23, 23 of Fig. 22, a fragment of the upper section being shown, the door rail and connections being omitted and a fragment of the air shaft being illustrated in position beneath the lower section. Fig. 24 is a detail section showing the keyed connection between one of the lower door supporting arms and its rock shaft. Fig. 25 is a view in front elevation of the parts seen in Fig. 23. Fig. 26 is a vertical section taken transversely through the rock shaft for the lower door and showing one of the glands therefor in elevation. Fig. 27 is a vertical section taken longitudinally through the said rock shaft and surrounding parts on the plane indicated by line 27, 27 of Fig. 26. Fig. 28 is a view in elevation of one set of blocks constituting one of the counterbalance weights for the lower door. Fig. 28ª is an inverted plan view thereof. Fig. 29 is a top plan view thereof showing the guides in plan and a fragment of the front plate in section. Fig. 30 is a fragmentary, vertical section through the front plate and rock shaft for the lower door, one of the jack levers for the rock shaft being seen in outline with its connected cable, the guiding rollers for said cable being seen in dotted lines and the bracket for said rollers being seen in elevation. Fig. 31 is a top plan view of the said jack lever, a fragment only of the shaft being seen. Fig. 32 is a horizontal section taken on the plane indicated by line 32, 32 of Fig. 30 and looking downwardly. Fig. 33 is a view in side elevation of one of the ladder rounds for the air lock, a fragment of the shell of the lower section being seen. Fig. 34 is a horizontal section taken on the plane indicated by line 34, 34 of Fig. 33. Fig. 35 is a vertical section taken through the caisson, a fragment of which is seen in Fig. 1, showing the working chamber door for the air shaft in end edge view. Fig. 36 is a top plan view of said door detached and showing the supporting rods therefor. Fig. 37 is a section taken on the plane indicated by line 37, 37 of Fig. 35, and looking in the direction indicated by the arrow. Fig. 38 is a top plan view of a concrete hopper. Fig. 39 is a vertical section therethrough taken on the plane indicated by line 39, 39 of Fig. 38, and illustrated as being positioned within the upper section of the air lock, a fragment of the upper section of the air lock being illustrated in section. Fig. 40 is a view in elevation of a fragment of the hopper showing one of the detachable joints thereof. Fig. 41 is a vertical section taken on the plane indicated by line 41, 41 of Fig. 40. Fig. 42 is a vertical section through a relatively small caisson showing the supporting means for the chamber door altered to adapt the door for manipulation in the relatively small cross section of the working chamber. Fig. 43 is a top plan view of a slightly modified form of air lock. Fig. 44 is a fragmentary elevation of the upper end of the top section thereof. Fig. 45 is a view in elevation of the inner end of one of the sections of the air shaft, the right hand edge being shown in the condition before being bent, and the left hand edge indicating the condition after being bent and trimmed. Fig. 46 is a vertical sectional view therethrough taken on the plane indicated by line 46, 46 of Fig. 45. Fig. 47 is a view in elevation of the left hand edge of the section of shell seen in Fig. 45. Fig. 48 is a similar view of the opposite edge of the said section of shell. Fig. 49 is a view in elevation of the inner surface of a fragment of the air shaft showing the ladder thereof in elevation. Fig. 50 is a longitudinal, vertical, central section taken on the plane indicated by line 50, 50 of Fig. 49. Fig. 51 is a transverse, horizontal section taken on the plane indicated by line 51, 51 of Fig. 49 and looking downwardly. Fig. 52 is a longitudinal, vertical section through a fragment of the shell of the shaft showing the connection of the segments of the shell in detail. Fig. 53 is a horizontal section taken on the plane indicated by line 53, 53 of Fig. 52. Fig. 54 is a similar section taken on the plane indicated by line 54, 54 of Fig. 52. Fig. 55 is a horizontal section taken transversely through one of the bucket guides on the plane indicated by line 55, 55 of Fig. 45. Fig. 56 is an enlarged, detail, horizontal section through a fragment of one of the ladder supporting brackets and connecting parts.

In the caisson art it has been proposed to eliminate the objectionable inwardly opening doors of the upper section of an air lock either by outwardly sliding, horizontal doors or outwardly swinging doors, but the outwardly sliding doors, of course, involve a permanent structure projecting laterally beyond the walls of the air lock and interfering with the contiguous structural work, and the outwardly swinging doors are correspondingly objectionable in requiring the maintenance of sufficient clearance for swinging such doors, and I therefore propose to obviate these objections by providing a door which moves about the longitudinal axis of the lock and concentric to the walls thereof.

It has been common heretofore to construct air shafts of tubular casings, which, after the completion of the masonry work, have usually been found to be so tightly wedged or so firmly retained by the adhesion of the surrounding concrete as to be rendered immovable, so that the practice of filling the working chamber and air shafts with masonry and leaving the casings in place in the finished structure is now ordinarily followed. It has, however, been proposed to remove the casings by forming them of longitudinal segments bolted together, but difficulty has been experienced in so uniting the segments as to prevent leakage, and my invention, among other things, contemplates the provision of a collapsible air shaft which may be produced at a relatively small expense, and at the same time is largely free from liability of leakage at the joints of the collapsible sections.

Referring to the drawings by numerals, 1 indicates a roof of a caisson constructed in any preferred manner with a suitable working chamber having upright inclosing walls 2 and the usual cutting edge 3. The roof 1 is penetrated by an opening 4 adapted to be closed by a sliding door 4', and leading upwardly from which is the air shaft 5 surrounded by the concrete or other masonry 6. To the upper end of the air shaft 5 is connected the air lock 7, the air lock and shaft being constructed in detail in the manner hereinafter specifically mentioned.

For a detail understanding of the construction of the air lock reference is had particularly to Figs. 1ª to 34 inclusive and Figs. 43 and 44. The air lock is composed of two sections, an upper section and a lower section, and the upper section consists of a preferably cylindrical shell 8 having a slide door 9 movable about the longitudinal axis of the shell and concentric to the walls of the shell as hereinafter mentioned, and a roof, head or cover 10 closing the upper end of the shell. The door 9 is positioned vertically and extends preferably substantially the full length of the shell 8, and at its lower end, as best seen in Figs. 8 and 9, is supported by rollers 11, 11 journaled on shafts 12, 12, each fixed to the door at one end and at the opposite end sustained by an inwardly bent bracket 13. The several rollers 11 are mounted to run on a flat bar track 14 which is sustained by bolts 15 extending through and carried by the shell 8 at those points where the track 14 extends contiguous to the shell and carried by a connecting strip or plate 16 forming the sill or brace plate for the lower end of the door-way for door 9 at those points where the track 14 extends contiguous to said plate 16. Each of the bolts 15 is provided with a spacing collar 17 between its supporting wall or plate and the track bar 14 and a nut 18 engages the inner end of the bolt and firmly retains the bar 14 in position, the bolt extending through a suitable aperture in the bar. An angle bar ring 19 is fixed to the lower edge of the shell 8 and plate 16 for stiffening the same, and said plate and shell are further rigidly secured together by splice plates 20, 20, arranged at the ends of the plate 16 and rigidly secured to said plate and to the shell 8. To prevent leakage when the door is closed a suitable packing gasket 21, preferably of rubber, is arranged between the plate 16 and the outer surface of the door 9. The door 9 is arranged to move just inside the shell, and the track bar 14 extends from a point beyond the door-way for door 9 at one side thereof to a point considerably beyond the door-way at the other side thereof, the bar 14 being arranged concentric to the shell and being of sufficient length to permit the door 9 to be moved about inside the shell until the entire door-way is open. In order to prevent movement of the door to an undesirable extent, the opposite ends of the track bar 14 are provided with stops, a back stop 23 being provided to limit the inward or opening movement of the door, and a similarly constructed fore stop 22 is provided for limiting the return or closing movement of the door 9. Each of the said stops consists simply of a suitable hook-shaped plate 24, the hook being positioned to inclose the track bar 14 and being apertured and mounted on one of the bolts 15, the upper end of the plate 24 being preferably bent outwardly, as at 25, into the path of movement of the respective edge of the door 9.

As best seen in Figs. 6, 14 and 15, the upper end of the door 9 is guided in its movement by a hinged connection consisting of a radial plate 26 which is fixed at its outer end to the upper end of the door 9 as by bracket 26', and is pivoted at its inner end to swing about the center of the shell. The head 10 is provided with a central, annular aperture 27 and a slot or opening 28 extends radially from said aperture to the periphery of the head, and is preferably provided at its outer end with a flaring opening or mouth 28' disposed centrally of the door-way for door 9. Within the aperture 27 is pivotally mounted a hub or pivot block 29 which preferably fits snugly within the aperture 27 and is fixed to the plate 26 in any preferred manner as by being provided with an annular flange 30 beneath the plate 26 and through which are passed screws 31 into the plate 26. The block or hub 29 is sustained in position by a plate 32 which is secured by screws 33 or otherwise suitably fixed to the block 29 and which overhangs portions of the head 10, as clearly seen in Figs. 14 and 15. To prevent lateral play of the parts, and also to avoid the collection of foreign substance about the moving parts a casing is provided to cover the same, such casing comprising a plate 35 secured, as by bolts 36, to the head 10 above the aperture 27, and a gasket 34 interposed between the plate 35 and the head 10, the gasket 34 being formed with a segmental slot 37 permitting movement of the plate 32 and guiding the same. The plate 35 and gasket 34 are provided with central registering apertures 38 which also register with the opening 29' through block 29 and constitute a continuous opening for the bucket cable. Leading from the opening 38 of the plate 35 and gasket 34 are registering slots 39 which lead to the inner end of the slot 28, the said slot 28 being preferably restricted as it approaches its inner end. The block 29 and plate 26 are provided with a radial slot 40 leading from the aperture or passage 29' to the periphery of flange 30 and the inner end of plate 26 and adapted in operation to be brought into register with the slots 39 when the block 29 is revolved by the opening movement of the door 9. In order as far as possible to eliminate leakage about the moving parts, a gasket 41 is secured to the under face of the head 10 above the inner end of the plate 26. To facilitate manual opening and closing of the door 9 a hand hold 42 is provided as best seen in Figs. 16, 17 and 18, the material of the door being cut away, as at 43, and supplemented by an inwardly stamped plate 44 riveted to the door 9 about the edges of the opening 43.

Sufficient space is left between the vertical edges of the slot or opening 43 and the end walls of the plate 44 for the ready admission of the fingers of the operator, and in operating the door the fingers of the hand are thrust into the opening 43 and the door drawn inwardly or outwardly by pressure exerted on the edges of the slot.

The door-way for door 9 is preferably strengthened by a stiffening plate 45 arranged at each side, and a suitable packing strip 46 is preferably arranged on the inner surface of the wall of the shell contiguous to the door-way in position for being engaged by the outer surface of the door, when the door is closed, for preventing leakage about the door.

The head 10 is preferably rigidly retained in place by an angle bar ring 10' surrounding the upper end of the shell and having its vertical flange outside of and fixed to the walls of the shell, the head 10 being preferably arranged beneath and fixed to the horizontal flange of said ring. At the point of the door-way for the door 9 a suitable filler plate 10" is arranged for causing the vertical flange of the ring to resist the bursting pressure on the upper portion of the door from within the shell, inside of which plate 10" is a gasket 10''' for preventing the escape of compressed air along the top of the door.

At one side of the door-way and preferably contiguous thereto and conveniently accessible to the operator of the door is a peep hole 48 formed in the shell, and preferably constructed in detail as indicated in Figs. 19, 20 and 21. The wall of the shell is formed with an opening 48' surrounded on the inside by a gasket 49 lying against the inner face of the wall and engaged by a glass plate 50 extending across and closing the opening 48'. A frame 51 is positioned for retaining the plate 50 in place and a gasket 52 is interposed between the frame 51 and the plate 50 for making a close joint, suitable bolts 53, 53 being provided for securing the parts in position, a spacing frame 54 being penetrated by said bolts and being interposed between the inner face of the shell and the gasket 52 for preventing lateral play of the glass 50 and preventing undue strain thereon. All of the bolts 53 except the middle bolt at one side of the opening 48' extend beyond the outer surface of the shell and engage and support a frame 55, the said frame being spaced from the shell by a spacing frame 56 through which the bolts 53 extend. The frame 55 extends across, above and below, the opening 48' and beyond said opening a distance in excess of the width of the opening, and is secured by suitable bolts 57, the spacing frame 56 being preferably in the nature of a gasket for preventing leakage about the bolts 57. Arranged within the frame 55 is a slidingly mounted door 58 which is adapted to be slid over the opening 48' for protecting the glass 50 especially during transportation or during movement of the parts while a new section of air shaft is being positioned. While only one glass peep hole is shown, of course as many as are desired may be used.

The lower section of the air lock consists of a shell or casing 59 one-half of which is curved to conform to the curvature of the shell 8 and is arranged to extend continuous thereof while the other half of the shell 59 is squared, as at 60, that is to say is formed rectangular in cross section having flat side walls extending outwardly and forwardly from the jucture of the squared portion 60 with the curved portion to its front flat wall. An angle bar 61 extends about and is fixed to the upper end of the shell 59 and has the horizontal flange of its curved portion lying against the horizontal flange of the angle plate 19, any suitable gasket or packing being interposed between said flanges if desired to prevent leakage. The angle bar 61 is curved to conform to the curved portion of the shell 59, and is formed straight and angular at the proper points, so as to fit snugly against the inner surface of the upper end of the squared portion 60. Beneath the horizontal flange of the bar 61 is arranged a plate 62 formed to fit snugly within the bar 61 and provided with an annular opening 63 arranged concentric to the upper section 8. The plate 61 thus forms a roof or closure for the squared portion 60 which extends beyond the upper section 8, and the horizontal flange of the bar 61 is secured to the plate 62 by rivets 64, or other suitable securing means, at points outside the upper section 8. Within the upper section 8, the plate 62 is secured to the horizontal flanges of both angle bars 19 and 61 by detachable bolts 65 passed through said flanges and threaded into the plate 62. A substantially semi-annular flat filler plate 66 lies between that portion of the horizontal flange of angle bar 19 which lies outside of or in front of the semi-circular portion of casing, and the ends of the plate 66 are preferably beveled off, as seen in Fig. 22, for snugly meeting the edges of the horizontal flange of angle bar 61 at the points of juncture between the curved and straight portions of the bar 61.

Secured to the under face of the plate 62 and registering with the opening 63 is an annular gasket 67 engaged by the door 68 which is adapted to close the opening 63. The door 68 is supported by bracket arms 69. As best seen in Figs. 24 and 25, each of the arms 69 consists of an angle plate, the horizontal flange of which is relatively wide and preferably extends for the full width of the door 68, and the vertical flange of which tapers upwardly and rearwardly, the horizontal flange terminating short of the front end of the vertical flange, and the vertical flange being provided at its front end with a suitable block 70 for producing a wider bearing for the shaft 71 which extends through the vertical flanges of the arms 69. Each of the said arms 69 is keyed to the shaft 71, as at 72, and the said shaft extends through the opposite side walls of the squared portion 60 of the lower section.

The flattened sides of the squared portion 60 are stiffened by horizontally arranged flat bars 73, 73 suitably riveted to the walls and vertically disposed flat bars 73', 73', and the front face of the squared portion is stiffened by channel plates 74, 74, the plates 74 being arranged in pairs, as indicated in dotted lines in Figs. 22 and 25, each pair forming a vertical channel in which is disposed a counter-balance weight 75, each of the weights 75 being made up of a number of separate blocks and the channel portion of the plates 74 terminating short of the upper end a sufficient distance for permitting the blocks to be removed or inserted laterally, one at a time, the remaining portion of the plate 74 being in the form of an angle iron. Disposed above each of the channels produced by the plates 74 are brackets 76, 76, riveted or otherwise suitably secured to the front plate of the squared portion 60, the brackets 76 being spaced apart and carrying therebetween a pulley 77 journaled on a shaft suitably secured to the bracket in front of the center of the bracket, and a similar pulley 78 is journaled on a shaft suitably secured to the brackets in the rear of the center thereof and above the pulley 77. A jack lever 79 is provided above each set of pulleys 77 and 78, and each of the jack levers is fixed to the shaft 71, as by a sleeve 79', surrounding the shaft 71 and set screws 79'' passed through the sleeve and engaging the shaft 71. The jack levers 79 obviously may be secured to the shaft 71 in any preferred manner. Each of the jack levers 79 is bifurcated at its upper end and carries a transverse pin 80 from which depends a suitable cable or strap 81 which extends downwardly past the pulleys 78 and 77, between the same, and extends through registering passages in the several blocks of the weight 75 to the lower end of the weight, and at the lower end engages a transverse pin 75' arranged in a suitable slot 75'' in the under face of the lowermost block of weight 75, so that the weight 75 is suspended from the jack lever 79, and the pulleys 77 and 78 serve as guides for the cable or strap 81 during movement thereof. It is to be noted in this connection that when the door 68 is swung downwardly the greatest amount of leverage is exerted on the shaft 71 just at the starting of the downward movement of the door, and the leverage decreases in a ratio proportionate to the approach of the door toward the line of gravitation, and the jack levers are so disposed that as the door moves downwardly and the free ends of said levers move upwardly, the straps or cables 81 will approach the shaft 71 and the leverage of the jack levers is therefore decreased at the same time and in the same ratio as the decrease of the leverage exerted by the door 68, and obviously in closing the door the ratio of increase of leverage as the door rises is compensated by a like ratio in the increase of leverage of the jack levers 79.

The shaft 71 is, of course, provided with the necessary glands for preventing escape of air, and these glands are preferably arranged inside the casing at the opposite ends of the shaft, as indicated in dotted lines in Fig. 25. Each of these glands, consists, as clearly indicated in Figs. 26 and 27, of a bearing plate 82 riveted or otherwise suitably secured to the wall of the squared portion 60, and a gland box plate 83 preferably bolted in place contiguous to the inner face of the plate 82, said plates 82 and 83 being spaced apart by a gasket 84 for obviating leakage, and a filler plate 61' being disposed between plate 82 and the inner face of squared portion 60 for compensating for the vertical flange of angle bar 61. The plates 83 and 82 are bored for accommodating the shaft 71, and a preferably bronze bushing 85 surrounds the shaft 71 within the bore and is flanged, as at 85', for finding a snug seat in an enlargement 83' in the bore of plate 83. A suitable packing or gasket 86 surrounds the shaft 71 and fits snugly against the flange 85' and is compressed in place by the outwardly projecting boss 87 of a nut 88 threaded onto the inwardly projecting annular threaded portion 83'' of the plate 83. The shaft 71 at its ends extends beyond the walls of the squared portion 60, and a suitable operating handle 89 is provided and adapted to be applied to either end of the shaft for enabling manipulation of the door 68 by an operator positioned near the door 9.

From the foregoing it will be apparent that the lock tender who is positioned contiguous to the door 9, and who is fully informed of what is going on inside the upper section of the lock by viewing the same through the peep hole 48, may readily manipulate the lever 89 for opening and closing the door 68, the weights 75 sufficiently counter-balancing the weight of door 68 for making the operation of lever 89 comparatively easy, particularly when considering the length of the lever relative to the size and width of the door. Of course, the door 68 may not be opened while there is any very appreciable difference in pressure between the interior of the upper section of the lock and the interior of the lower section thereof, and in order to equalize the pressure I arrange a tube 90 threaded through the upper head or plate 62 of the lower section 58, the said tube 90 extending into the upper section 8 and being formed intermediate its length with a three-way valve 91 having an exhaust nozzle 92. The valve 91 is arranged sufficiently contiguous to the door 9 and to the lever 89 as to readily enable the lock tender to manipulate the valve. When he wishes to equalize between the upper and lower sections of the lock the valve 91 is turned to establish communication between the sections, so that the pressure from the lower section will exhaust into the upper section, and as soon as the pressure is equalized, the lever 89 may be operated for opening the door 68, the equalization of pressure being indicated by the readiness with which the lever 89 will move. When it is desired to close the door 68, so as to enable opening of door 9, the valve 91 is turned to cut off communication between the lower and upper sections, and the three-way valve is brought into register with the exhaust nozzle 92, so that the pressure from the upper section 8 will exhaust into the atmosphere until the pressure in section 8 drops to atmospheric pressure. The door 9 may then be opened. Thus when one is entering the caisson, the lock tender after sliding back the door 9 to permit the entrance will bring the door 9 back to its closed position, and then turn the valve 91 to admit pressure to the section 8. As soon as the lever 89 will swing readily indicating an equalization of pressure, the lock tender will swing the door 68 downwardly to its open position and the person may descend into the caisson, and when it is desired to leave the caisson, the person leaving will pass up through the opening 63 and when the lock tender observes that the person is in the upper section 8, he will close door 68, cut off the supply of pressure through pipe 90 and open the exhaust, and as soon as the atmospheric pressure is reached in the upper section, the door 9 will be slid back and exit thereby permitted.

It is to be observed that when the door 9 is closed, the plate 26 closes the slots 28 and 39 for preventing the escape of compressed air, and as the bucket cable will practically fill the passage 29', leakage from the upper section of the lock is substantially eliminated, and at the same time the entrance and exit to and from the lock may be effected with a minimum loss of air pressure. Obviously when operating with the bucket, the bucket is introduced laterally through the door-way while its cable passes through the slot 28, the opening 40 being in register with the slot so as to permit the cable to readily assume the central position, that is the position in the passage 29' which permits of the closing of the door 9. The bucket may thus be readily lowered by its cable into the caisson, and when being removed the door 9 is swung open, which removes the plate 26 from beneath the slot 28 and brings the opening 40 into register with such slot for allowing the cable to move along the slot if desired, and thus permitting lateral removal of the bucket. Of course, the bucket must be locked in and out in the same manner as described above with respect to the entrance and exit of a person.

In order to facilitate entrance to and exit from the caisson, a ladder is provided in the lower section of the lock consisting of strap-like rounds 93, 93 suitably spaced apart, and each consisting of an inwardly bent strap, as indicated in detail in Figs. 33 and 34, the ends of the strap being formed into feet 94, which are riveted or otherwise suitably secured to the shell of the section. As indicated in Fig. 23, the uppermost round 93 is smaller than the other rounds, that is does not project inwardly as far as the other rounds, and may if preferred be made shorter. The reason for making the uppermost round smaller will become obvious from the disclosure in Fig. 23, and particularly from a consideration of the arc described by the free edge of the door 68, as a larger round would interfere with the free swinging of the door, said door being adapted to swing downwardly to a position in the line of its gravitation out of line with the opening 63.

The lower end of the shell 59 or lower section of air lock is closed by a bottom head plate 95 shaped similarly to plate 62 and formed with an annular aperture 96 disposed axially with respect to the air shaft 5. The plate 95 is preferably secured to the lower end of the lower section 59 by an angle bar 97 riveted or otherwise suitably secured to the shell of the lower section and attached to plate 95 by rivets 64'. Plate 95 and bar 97 are detachably bolted as by bolts 98, 98 to an angle bar ring 99, the bolts 98 extending through the horizontal flange of bar 97 and through plate 95 and being threaded into angle bar 99 which latter surrounds and is arranged concentric to the opening 96. The bar 97 is, of course, shaped to conform to the cross section of the shell 59 with its squared portion 60, and throughout those portions of the bar which are straight, the rivets 64', are countersunk only at their upper ends, and the remainder of rivets 64' are countersunk at both ends. The plate 95, throughout those portions which have straight outer edges, is provided with bolts 98 passed through the plate contiguous to aperture 96 into engagement the bearing of the head, and the head is arranged on the inside of the air shaft for readily enabling removal of the bolts from inside the shaft. The strips 114 are spaced apart any preferred distances, but, of course, are sufficiently close together not to leave an opening therebetween wide enough to permit the bucket to strike the wall of the air shaft, and each of the strips is of a length slightly less than the length of a section of the air shaft, so that each section has its own set of strips and in fact each segment of each section is preferably provided with a pair of strips, and when two or more sections of the shaft are assembled, as indicated in Fig. 1, the strips of one section are preferably alined with respect to the strips of the other section.

In order to facilitate the use of the shaft as a man shaft as well as a spoil shaft, I construct a ladder leading from the lower end of the ladder in the lower section of the air lock and extending down to the roof of the caisson, such ladder consisting, as best seen in Figs. 49, 50, 51 and 56, of a pair of side rails 116 supported at suitable intervals on brackets 117 fixed to the wall of the air shaft and spaced at the desired intervals along the length of the shaft, said rails 116 being connected by rods 118 constituting the rounds of the ladder. The ladder is preferably constructed in sections, one section being fixed to each of the air shaft sections, and of course, for convenience one section of ladder is fixed to one segment of the respective section of air shaft. As seen in detail in Fig. 56, each of the brackets 117 is preferably secured in place by bolts 117′ threaded into threaded apertures in the walls of the air shaft and coated with white lead or similar substance for air-tightness, the bracket 117 being curved to snugly fit against the inner face of the wall. The ends of the bracket are inwardly turned to receive the rails 116, and are preferably secured to said rails by rivets 117″.

The lower end of the shaft 5 is secured in place on the roof 1 by an angle plate ring 119 anchored to the roof by embedded bolts, and detachably bolted to the lower end of the shaft, the said ring being protected by an annular guard 120 preferably of sheet iron, the detail features of construction for connecting the shaft to the roof not being made the subject of claim herein, as the same are claimed specifically in my companion application for a patent filed even date herewith and designated by Serial No. 435,776.

To prevent escape of compressed air from the working chamber, when connecting a new section of air shaft, I provide the door 4′ which, as seen in detail in Figs. 35, 36 and 37, preferably consists of two layers of planks, one layer being arranged at right angles to the other, and the two layers being suitably secured together, as by bolts 121, 121 having their heads countersunk in the upper layer of planks and engaging nuts at their lower ends beneath the lower layer of boards. As a further securing and stiffening means for the several boards or planks comprising the two layers of which the door 4′ is constructed, drift bolts 122 and 123 are passed through the edges of the outer boards into the inner boards for binding the boards together. The outer ends of a pair of bolts 123 at each side of the door project beyond the edges of the door, and are formed into eyes 124 slidingly surrounding and supported by the guiding rods 125. The guiding rods 125 are supported by hangers 126 depending from and having their upper ends embedded in the concrete of the roof. Thus the door 4′ is slidingly mounted and may be slid into position beneath the opening 4 for closing the same, or slid along the rods 125 away from the opening 4 for leaving the entrance clear from the shaft to the working chamber. A gasket 131 is secured to the under face of the roof 1 about the opening 4 for making a close joint between the roof and door 4′ when the door is closed.

In order to enable the door 4′ to be utilized in connection with the smaller caissons, some of the drift bolts 122 at the rear edge of the door project beyond the said edge, and are formed with eyes 127 preferably left open, and a part of the edge of the door cut away, as at 128 as seen in Fig. 36. When desiring to use the door 4′ in connection with a small caisson, such for instance as is indicated at 129 in Fig. 42, suitable combination guide rods and hangers 130 are provided and have their end portions embedded in the walls of the caisson leaving a vertical portion near the roof opening 4ª, and a horizontal portion leading away from said roof opening. The door 4′ is adapted, when used in the structure seen in Fig. 42, to be swung downwardly to a vertical position and slid along the horizontal portion of the rods 130 away from the opening 4ª, as indicated in dotted lines in Fig. 42. This arrangement is used only when the cross sectional area of the chamber is not sufficiently large to accommodate the door 4′ with its horizontally sliding supports. When it is desirable to hold the door 4′ in a closed position, when the same is mounted as disclosed in Fig. 42, a suitable rope or cable 132 is attached to the door and connected with one of the rounds of the ladder in the air shaft for supporting the door in position. The cable or rope 132 is preferably attached to the door by being secured to one of the bolts 122 through a notch or with the ring 99 without engaging the horizontal flange of the straight portions of the bar 97. Thus it will be obvious that by removing the bolts 98, the air lock may be readily removed, and when it is desired to separate the sections of the air lock it is only necessary to remove the bolts 65; see Fig. 23.

To the ring 99 is detachably attached the shaft 5, as by removable bolts 100, passing through a preferably flat ring or band 101 and through the upper end of the walls of the shaft into the vertical flange of the bar 99, a suitable annular gasket 101' being arranged between band 101 and the inner face of the upper end of shaft 5. The band 101 is employed for strengthening and stiffening purposes and may be of any dimensions preferred. Suitable packing between the angle bar 99 and the shaft 5 prevents the escape of compressed air at the top of the shaft 5.

The shaft 5 is made up of one or more sections of pipe according to the height of the air lock above the working chamber, two sections being illustrated in Fig. 1 with the connection therebetween. Each section consists of three or more shell segments 102. Each of the shell segments 102 has its longitudinal, vertical edges bent back upon themselves as indicated in detail in Fig. 54 producing a longitudinal bead or shoulder 103 lying within a vertical groove or recess 104 in the vertically arranged splice plate 105. The splice plate 105 is preferably relatively heavy and connects the two contiguous edges of two segments 102 by the shoulder of groove 104 engaging the oppositely facing shoulders 103. During the course of constructing the segments 102, the edges thereof are punched with notches, as at 106, seen at the right hand edge of the segment shown in Fig. 45, so that when the edge is bent back upon itself, as indicated at the left hand edge of the same figure, the half round bolt holes 106' are produced and are adapted to permit the passage of bolts 107 between the contiguous edges of the segments 102 when said holes 106' in one segment are brought into register with those of a contiguous section. The bolts 107 are spaced at suitable intervals along the length of the splice plate 105 and are threaded into said plate and extend outwardly from the inside of the air shaft, passing through an inside vertically arranged splice plate 108 and a gasket 109 disposed between the plate 108 and the inner faces of the contiguous segments 102. In practice it is found that the gasket 109 is adequate to prevent escape of air, but, if desired, the space between the contiguous edges of the segments 102 may be filled with oakum, or other suitable packing. A readily obvious advantage in the arrangement of joint disclosed resides in the fact that the bursting pressure on the walls of the air shaft is not exerted on the bolts 107 but is exerted on the shoulders 103, the splicing plate 105 being constructed relatively thick for readily resisting this strain, and being transversely tapered outwardly, as seen in Fig. 53 and 54 for facilitating withdrawal from the concrete after the air shaft has been dismantled.

As seen in detail in Fig. 52, the sections of the air shaft are united by being brought end to end and securely connected together by a splicing band 110. The splicing plates 105 and splicing straps 108 terminate short of the ends of sections 102 and thus leave an exposed area at the ends of the section of air shaft, the beads 103 terminating with the termination of the splice plates 105. The annular band 110 fits snugly between the contiguous ends of plates 105, and consequently, of course, extends vertically across the joint between the lower section of the air shaft and the section above the same. An internally arranged annular splicing band 111 is disposed similarly to the band 110, the plates 108 terminating in the same manner as plates 105. A band-gasket 112 is preferably arranged between the plate 111 and the inner face of the air shaft, and the plates 111 and 110 are secured together and to the shaft by bolts 113, 113, one row of the bolts 113 being arranged above and one row below the juncture of the sections of the air shaft. All of the bolts 107 and 113 are passed from the inside of the air shaft and threaded into the outer element so as to be capable of being readily removed by an operator on the inside of the shaft.

During the ascent or descent of the bucket, when the shaft is used as a spoil shaft, there is naturally a tendency on the part of the bucket to swing laterally and strike the walls of the shaft. In order to prevent injury to the walls, I secure thereto bucket guides consisting preferably of wooden strips 114, 114 preferably beveled at their ends and secured in place by bolts 115, 115 passed through the respective strip and threaded into the wall of the air shaft and having their heads embedded or countersunk in the material of the strip, as clearly seen in Figs. 46 and 55, so that nothing but the smooth surface of the outer face of the strip is exposed to the bucket, the beveled ends of the strip obviating any danger of catching or hanging of the bucket during transit, as by the engagement of the edge or other part thereof with the end of a strip. As best seen in Fig. 55, the countersunk portion of strip 114 for each of the bolts 115 is sufficiently larger than the head of the bolt to allow clearance for an operating tool. A washer 115' surrounds each bolt 115 and is engaged by the head thereof for increasing recess 133 formed in the upper face of the door and extending downwardly past the said bolt.

In utilizing the shaft 5 for the intake of materials, and particularly concrete, I provide an intake hopper which, in operation, is disposed within the upper section of the air lock, and consists of a downwardly tapering shell 134 which has its lower open end extending into the opening 63, the shell being supported by brackets 135, 135 fixed to the shell at suitable intervals, and overhanging and resting upon the horizontal flange of the angle bar ring 19. The shell 134 is formed of two segments, the upright edges of the segments lapping at the points of juncture and being stiffened by a splicing plate 136 arranged outside the shell. Suitable detachable bolts 137, 137 are passed through the lapping edges of the segments and are threaded into the respective plate 136. Each of the segments is preferably stiffened at its upper and lower edges by strips 138 and 139, the strip 138 being preferably arranged on the inner surface of the segment, and the strip 139 being arranged on the outer surface thereof.

In practice, when it is desired to introduce concrete or other like substance, into the caisson, assuming the door 4' to be in an open position, door 68 being closed the pressure is exhausted from the upper section of the lock, and the door 9 is then opened. The hopper is filled, or partly filled, with the material to be introduced, such material resting upon the door 68. The door 9 is then closed and the pressure equalized between the lower and upper sections of the lock, and then the door 68 is opened and the concrete is thereby permitted to drop in a body down through the shaft into the working chamber. The downwardly tapering form of the hopper tends to concentrate or mass the charge, and thus the objectionable spreading of the cement about the walls of the shaft as usually results in the ordinary operation of dropping concrete down a shaft is obviated. The hopper may be filled by a chute extended through the door-way during the filling operation, and withdrawn after the hopper has been filled. Whenever it is desired to remove the hopper from the lock, it is only necessary to collapse the same by removing the bolts 137, and the two sections of the hopper may then readily be removed.

In Figs. 43 and 44, I have illustrated a slightly altered form of upper section of air lock, the alteration being so slight that the same reference numerals have been employed, and the same description applies, the only change residing in an increase or enlargement in the width or size of the radial slot in the top plate of the upper section, and a consequent increase in the size of the plate connected with the door for closing the said slot. Obviously, the slot may be made of any size desired, and when increased to the relative proportions indicated in Figs. 43 and 44, is adapted not only to readily facilitate the admission of the bucket cable, but is adapted to admit beams and other large objects. As the work of lowering a caisson proceeds, the successive sections of the shaft are positioned and secured in place, as above set forth, and during such positioning, while the air lock must necessarily be removed, the door 4' serves to prevent the escape of compressed air from the working chamber. After the caisson has arrived at the required elevation, it being assumed that the concrete filling 6 has been built up as the caisson sinks, so that the air shaft is surrounded by concrete, the shaft may readily be removed by first removing the air lock, and then removing the bolts 107 and bolts 113 of the first section of the air lock, whereupon the several segments of the first section may be collapsed and drawn out of the opening in the concrete, and if it is found that the splice plates 105 are retained in the concrete, they may be pried loose and removed. The bands 110 and 111 are next loosened by the removal of the bolts 113 at the upper end of the second section of air lock, and the band 111 is removed. The bolts 107 of the second section of air lock are then removed and the segments collapsed and removed, whereupon the band 110 may be removed if the same has not already been removed, and the splicing plates 105 of the second section are removed. The removal of the several successive sections of air lock is continued in this manner until the last section has been removed, whereupon the opening in the concrete may be filled and the structure is thus rendered complete. The collapsible form of shaft thus insures recovering of the shaft and effects a material saving in caisson work. The removal of the air shafts can also be begun from the bottom if desired. Of course, the door 4' may be removed at any convenient time after the caisson has arrived at the required elevation, and to remove the door only requires the removal of the nuts 125' from the rods 125, and the sliding of said rods longitudinally out of engagement with the eyes 124. If the caisson is of the smaller type and the hangers 130 are employed, the door may be removed by simply being moved edgewise while the said hangers 130 are permitted to escape through the passage 128.

While I have shown the above described collapsible air shaft and improved air lock as being used in connection with pneumatic caissons, the invention made manifest herein may be utilized in structures similar to those disclosed and adapted for the construction of tunnel shafts and for other construction

What I claim is:—

1. In an air lock, the combination with an air lock section, of a vertically disposed pivotally mounted sliding door therefor.

2. In an air lock, the combination with a section having a door-way, of a door therefor mounted to swing in lines parallel to the walls of the section to and from a position closing said door.

3. In an air lock, the combination with a lock section having a door-way, of a door for closing the same and adapted to swing about one of the axes of the section as an axis.

4. In an air lock, the combination with a lock section having a door-way, of a door for closing the same adapted to be swung about the longitudinal axis of the section as the axis of movement of the door.

5. In an air lock, the combination with a cylindrical lock section having a door-way, of a door for closing said door-way adapted to swing in a path concentric to the walls of the section.

6. In an air lock, the combination with a section having a door-way, of a door for closing said door-way adapted to swing and slide in a path parallel to the walls of said section.

7. In an air lock, the combination with a section having a door-way, of a door hinged to swing about the center of the section.

8. In an air lock, the combination with a section having a door-way, of a door therefor pivotally connected to the section and adapted to swing about the longitudinal axis thereof.

9. In an air lock, the combination with a lock section having a door-way, of a door therefor, and a plate fixed to the door and pivoted to the lock section in position for causing the door when moved to swing about the wall of the caisson parallel thereto.

10. In an air lock, the combination with a lock section having a head formed with an opening, of a pivoted plate adapted to be swung in a path parallel to the face of the head to and from a position closing said opening.

11. In an air lock, the combination with a lock section having a head formed with an opening, of a pivoted plate arranged with its flat faces parallel to the faces of the head and adapted to be swung edgewise on its pivot to and from a position closing said opening.

12. In an air lock, the combination with a lock section having a head formed with an opening, the lock section being formed with a door-way, of a pivotally mounted plate arranged with its faces parallel to the faces of the head and adapted to be swung edgewise on its pivot to and from a position closing said opening, and a door for said door-way connected with said plate.

13. In an air lock, the combination with a lock section having a head formed with an opening, the section also having a door-way, of a pivotally mounted plate arranged with its flat faces parallel to the flat faces of the head, and a slidingly mounted door for said door-way connected with and adapted to be guided in its sliding movement by said plate.

14. In an air lock, the combination with a lock section having a head formed with an opening, of a plate pivoted centrally of the head and extending radially from its pivot plate and arranged with its flat faces parallel to the head and disposed and adapted to be moved on its pivot edgewise to and from a position closing said opening.

15. In an air lock, the combination with a lock section having an opening in one of its walls, a pivot block journaled in said wall, means for limiting the pivot block against lateral play, and a plate connected with said block and adapted, when the block is rotated, to be swung to and from a position closing said opening.

16. In an air lock, the combination with a lock section having an opening formed in one of its walls, a pivot block journaled in one of the walls of the lock section, a guide plate for limiting lateral play of said block, and a door connected to said block and adapted to be moved to and from a position closing said opening when the block is rotated.

17. In an air lock, the combination with a lock section having a head formed with an aperture and an opening leading therefrom to the outer edge of the head, a pivot block journaled in the aperture and formed with an opening adapted at times to register with the opening in the head, and a plate connected with said pivot block and adapted, when the opening in the pivot block is moved to a position out of register with the opening in the head, to close said opening in the head.

18. In an air lock, the combination with a lock section having a head formed with an aperture and an opening leading therefrom to the periphery of the head, of a pivot block journaled in said aperture, and a plate fixed to and surrounding said block, the block and plate being formed with an opening adapted at times to register with the opening in the head, the main portion of the plate extending from the pivot block at one side of the opening in the pivot block and head, said plate being positioned and adapted, when the opening in the plate and block is not in register with the opening in the head, to close said opening in the head.

19. In an air lock, the combination with a lock section having a door-way and a head formed with an aperture and an opening leading from said aperture to said doorway, of a pivot block journaled in said aperture, a plate connected therewith and adapted to swing with the pivotal movement of said block to and from a position closing said opening, and a door connected with said plate and adapted to be moved to and from a position closing said door-way relative to the closing of the said opening.

20. In an air lock, the combination with a lock section formed with a door-way and having a head formed with an aperture and an opening leading therefrom radially to the door-way, of a pivot block journaled in said aperture and itself apertured and formed with an opening leading from its aperture to its periphery, a plate connected with said pivot block and extending radially therefrom, and a door fixed to said plate adapted to be moved to and from a position closing said door-way, the relative position of the door and plate with respect to the pivot block being such as to cause the opening in the pivot block to register with the opening in the head, when the door is opened, and to be out of register therewith when the door is closed.

21. In an air lock, the combination with a lock section formed with a door-way and having a head, of a pivoted block journaled in said head, a movably mounted door for said door-way, a plate connecting the door with said pivot block on one side of said head for guiding the door in its movement, and a flange detachably connected with the pivot block and lapping the other side of said head for retaining the pivot block in position.

22. In an air lock, the combination with a lock section having a door-way at one side and a head at one end, of a pivot block journaled in said head, a door arranged to move about the side of said section, and a plate rigidly connecting said door with said pivot block.

23. In an air lock, the combination with a lock section having an opening, of a block journaled in the wall of said section, a plate connected with said block and adapted to be moved to and from a position closing said opening and to be guided in its movement by said block, a guiding flange extending from said block on the opposite side of the head from the plate, and a guide-way for the flange.

24. In an air lock, the combination with a lock section formed with an opening in one of its walls, a pivot block journaled in one of the walls of the section, a plate connected with said block and adapted to be swung, when the pivot block is moved pivotally, to and from a position closing said opening, a flange projecting from said block on the opposite side of the wall of the lock section from the plate and lapping said wall, and a casing fixed to the wall and inclosing said flange and formed with a guideway for the flange.

25. In an air lock, the combination with a lock section having a head formed with an opening, of a pivot block journaled in said head, a plate fixed to the pivot block beneath the head and adapted to be swung pivotally to and from a position closing said opening, a flange projecting from said pivot block and overhanging the upper surface of the head, a plate fixed to the head and spaced above the flange, and a gasket interposed between the plate and the head and formed with a segmental opening for accommodating movement of the flange relative to the pivotal movement of the block.

26. In an air lock, the combination with a lock section having a head formed with an opening, of a pivot block journaled in said head, a plate carried by said block and adapted to be swung to and from a position closing said opening, a plate fixed to the head above said pivot block, a gasket interposed between the last mentioned plate and the head, said gasket being formed with a segmental recess, and a flange projecting from said pivot block and overhanging the upper face of the head within the said segmental recess.

27. In an air lock, the combination of a lock section formed with an inspection opening, a transparent plate closing said opening, a gasket surrounding the opening and interposed between the plate and the wall of the section, means for retaining the transparent plate in position, a slide arranged outside of said transparent plate and adapted to be moved in front of the same, and guide-ways for said slide.

28. In an air lock, the combination with a lock section, of a door slidingly mounted to move in a path parallel to the walls of the section within the section, a hand opening being formed in said door, and an inwardly stamped plate fixed to the door about said opening for preventing escape of air through the opening, and leaving a space between the inner surface of the door contiguous to said opening and the outer surface of the plate.

29. In an air lock, the combination with a lock section, of a rail spaced from the wall of said section and arranged concentric thereto, a door slidingly supported on said rail, and a hinged connection for said door.

30. In an air lock, the combination with a lock section, of a rail arranged on the inside of said section and spaced from the wall thereof and conforming to the contour of said wall, a door slidingly supported by said rail, and a hinged connection for said door.

31. In an air lock, the combination with a lock section, of a rail spaced from the wall thereof and conforming to the contour of said wall, a door slidingly supported by said rail, and pivotal means for guiding the door in its movement on the rail.

32. In an air lock, the combination with a cylindrical lock section, of a rail spaced therefrom and arranged concentric thereto, a transversely segmental door slidingly supported by said rail, and pivotal means for guiding the door in its movement on the rail.

33. In an air lock, the combination with a cylindrical lock section, of a rail spaced on the inside thereof and arranged concentric to the wall of the section, a door slidingly supported by said rail, and a pivotally mounted plate connected with said door for guiding the door in its movement on the rail.

34. In an air lock, the combination with a cylindrical lock section, of a rail arranged concentric to the walls of said section, a door slidingly supported by said rail, and a pivotally mounted plate arranged to have its free end swing in a path concentric to the walls of the lock section, the said free end of said plate being connected with the door for guiding the door in its movement on the rail.

35. In an air lock, the combination with a cylindrical lock section having a vertical door-way at one side, of a door for said door-way conforming to the contour of the wall of said lock section, a rail arranged concentric to the lock section and disposed for slidingly supporting the door, said door extending above the rail, and a pivoted guide plate fixed to the upper portion of the door for guiding the door in its movement.

36. In an air lock, the combination with a cylindrical lock section formed with a head at its upper end and having a door-way in one of its vertical sides, of a door slidingly mounted at its lower end and adapted to be slid in a path parallel to the walls of the section, and a plate pivotally connected to the head of the section and connected with the upper end of the door for guiding the door in its movement.

37. In apparatus of the class described, a lock section comprising a shell formed with an opening at one side, a connecting plate extending across said opening, splice plates fixed to the ends of the said connecting plate and to the walls of the shell contiguous to the opening, and a movably mounted door adapted to be moved into position for closing said opening and when so positioned to engage said connecting plate for resisting bursting pressure from within the shell.

38. In apparatus of the class described, a lock section comprising a cylindrical shell, an angle bar ring arranged within the lower end of the shell and having its vertical flange connected with the shell, an angle bar ring for the upper end of the shell arranged outside the shell and having its vertical flange connected with the shell, a head fixed to the horizontal flange of the upper ring, said shell being formed with a door-way at one side, a slidingly mounted door arranged within the shell and extending upwardly above the lower edge of the vertical flange of the upper ring and adapted to be held thereby against bursting pressure from within the shell, and a connecting plate at the lower end of the door-way connecting the walls of the shell contiguous to the door-way and extending above the lower end of the door for retaining the lower end of the door against bursting pressure from within the shell.

39. In an air lock, the combination with a lock section having an opening, of a swinging door for closing the same, a counter-balance weight for said door, and means connecting the weight with the door adapted to vary the counter-balancing effect of the weight relative to various positions of the door.

40. In an air lock, the combination with a lock section having an opening, of a vertically swinging door for closing the same, a counter-balance weight for the door, and means connecting the door and weight adapted to vary the counter-balancing effect of the weight in a ratio proportionate to the leverage of the door upon its mounting in its various positions.

41. In an air lock, the combination with a lock section having an opening, of a rock shaft, a door fixed thereto and adapted when the shaft is rocked to be swung to and from its closed position, a lever or arm connected to the shaft and projecting from the opposite side thereof from the door, a counter-balance weight, and a flexible connection between said weight and said arm.

42. In an air lock, the combination with a lock section having an opening, of a door for closing the same, a rock shaft carrying said door, a lever projecting from said shaft on the opposite side thereof from the door, a counter-balance weight, a flexible connection between said weight and lever, and guiding means engaging said flexible connection for limiting the lateral play thereof.

43. In an air lock, the combination with a lock section having an opening, of a door for closing the same, a rock shaft carrying said door, a lever projecting from said rock shaft on the opposite side from the door, a cable suspended from said lever, a weight sustained by said cable, and guiding means on opposite sides of said cable arranged between the lever and the weight for limiting the lateral movement of that portion of the cable between the weight and guiding means.

44. In an air lock, the combination with a lock section having an opening, of a rock shaft, a door connected thereto and adapted to be swung, when the shaft is rocked, to and from a position closing said opening, a vertically movable weight comprising separable blocks, and connections between said weight and rock shaft for counter-balancing the weight of the door.

45. In an air lock, the combination with a lock section having an opening, of a door for closing the same, a rock shaft carrying said door, a counter-balance weight for the door connected with the rock shaft and comprising a plurality of blocks and a guide-way for the weight, part of the wall of the guide-way being omitted for a distance equal to the thickness of a block.

46. In an air lock, the combination with a lock section having an opening, of a door for closing the same, a rock shaft carrying said door, a counter-balance weight for the door connected with the rock shaft, and guiding plates for said weight having flanges for limiting lateral play of the weight, some of said flanges terminating short of the length of the plates.

47. In an air lock, the combination with a lock section having an opening, of a door for closing the same, a rock shaft carrying said door, a counter-balance weight for the door connected with said rock shaft, and channel plates engaging and guiding said weight, the flanges of the exposed edges of the plates terminating short of the length of the plate for facilitating removal of the weight.

48. In an air lock, the combination with a lock section having an opening, of a door for closing the same, a rock shaft carrying said door, a counter-balance arm for the rock shaft, a weight suspended from said arm, and comprising a plurality of blocks, and channel plates disposed for forming guide-ways for said weight, the inner or exposed flanges of said channel plates terminating short of the length of the plates a distance equal substantially to the width of one of the weight blocks.

49. In an air lock, the combination with a lock section having an opening, of a door for closing the same, a rock shaft carrying said door, a counter-balance arm extending from said rock shaft, a weight suspended from said arm, a pair of channel plates having their outer flanges fixed to the wall of the lock section in position for retaining the plates as guides for said weight, and the inner flanges of said plates terminating short of the length of the plates for facilitating removal of said weight from between the plates.

50. In an air lock, the combination with a lock section formed with a transversely curved portion and a transversely squared portion connected thereto, of a shaft journaled in said squared portion and extending beyond the walls of the same, a head plate for the upper end of said lock section formed with an opening, a door for said opening connected with and supported by said shaft, a plurality of jack levers projecting from said shaft on the opposite side thereof from the door, counter-balance weights suspended from said levers, and guide plates for said weights connected with the walls of said squared portion.

51. In an air lock, the combination with an upper section, of a lower section comprising a shell formed with a transversely curved portion and a transversely squared portion connected thereto, and a head plate secured to the upper end of the shell and to the lower end of the upper section and formed with an opening communicating with the upper section, a door for closing said opening, a rock shaft journaled in the squared portion of said shell, and connected with said door for supporting the same, and a weight slidingly mounted within said squared portion and connected with said rock shaft for counter-balancing the weight of the door.

52. In an air lock, the combination with a lock section having an opening, of a pivotally mounted door for closing the same, and a slidingly mounted weight connected with the pivoted support for the door for counter-balancing the weight of the door.

53. In an air lock, the combination with a lock section having an opening, of a door for closing the same, a rock shaft, an arm fixed to the rock shaft and extending beneath the door, a flange extending laterally from said arm and connected with the door, and means for rocking said rock shaft.

54. In an air lock, the combination with a lock section formed with an opening, of a rock shaft, a pair of arms extending therefrom, each formed with a flange extending laterally therefrom toward the other arm, a door connected with said flanges and adapted to close said opening, and means for rocking said rock shaft for moving the door to and from its closed position.

55. In an air lock, the combination with a lock section having an opening, of a door for closing the same, an arm for supporting said door, a rock shaft keyed to said arm, a bearing plate fixed to the arm and surrounding the rock shaft and engaged by the key, and means for rocking said shaft.

56. In an air lock, the combination of upper and lower lock sections formed with an intercommunicating opening therebetween, a door for closing said opening, means operable from the exterior of the lock sections for closing and opening said door, and counter-balance means for the door arranged within the lower lock section.

57. In an air lock, the combination of upper and lower lock sections, a plate closing the upper end of the lower lock section and formed with an opening affording communication between the two lock sections and approximately equaling in size the cross sectional area of the upper lock section, and a door for closing said opening mounted to be moved to a position out of line with said opening one of said lock sections being cylindrical and the other formed with a squared portion to receive the door when open.

58. In an air lock, the combination of upper and lower intercommunicating lock sections, a door for shutting off such intercommunication, a pivotal support for said door, and means for moving the door pivotally within the lower lock section to a position out of line of the communicating opening between the lock sections, the upper section being cylindrical and the lower section formed with a squared portion for receiving the door when in its open position.

59. In an air lock, the combination of lock sections, an interposed door controlling communication therebetween, means under the control of an exteriorly positioned lock tender for actuating said door, one of said lock sections being formed with an inspection opening disposed contiguous to the position naturally occupied by the lock tender and conveniently situated for his inspection of the interior of the lock, and transparent means closing said opening.

60. An air lock section, comprising a shell formed with a transversely curved portion and a squared portion connected therewith, a stiffening plate arranged longitudinally of the shell at each jointure between the curved portion and the squared portion, transversely disposed stiffening plates engaging the side walls of the squared portion, and longitudinally disposed stiffening plates engaging the front wall of said squared portion.

61. In an air lock, the combination with upper and lower lock sections, of a ladder for the lower section comprising rounds each formed of an inwardly stamped flat plate bent at its ends into feet attached directly to the wall of the lower lock section within said section.

62. In an air lock, the combination of upper and lower lock sections and an annular angle bar fixed to the lower end of the upper lock section and having its horizontal flange exposed at the lower end of the upper lock section, and means detachably connecting the said horizontal flange to the upper end of the lower lock section.

63. In an air lock, the combination of upper and lower lock sections, an angle bar fixed to the lower end of the upper lock section, and an angle bar fixed to the upper end of the lower lock section, and means detachably securing the horizontal flanges of said angle bars together.

64. In an air shaft for caissons, the combination of upper and lower lock sections, a tube arranged beneath the lower end of the lower lock section and an angle bar fixed to said tube and having a horizontal flange, an angle bar fixed to the lower end of the lower section and having a horizontal flange arranged above the horizontal flange of the first mentioned angle bar, and means for detachably securing said flanges together.

65. In an air shaft for caissons, a tube having a horizontal flange at its upper end, an air lock resting upon said flange and comprising upper and lower lock sections, and means for detachably securing the lower end of the lower lock section to the upper end of the tube.

66. In a shaft for caissons, the combination of sections arranged edge to edge forming an inclosure, projections extending from the contiguous edges of said sections, and splice plates inclosing the projections of the edges of contiguous sections and engaging said projections for resisting expanding pressure from within the inclosure formed by said sections.

67. In a shaft for caissons, the combination of a longitudinally grooved splice plate, a shell formed with separable contiguous edges, said edges being provided with projections extending into the groove of the splice plate and engaged by the splice plate for resisting expanding pressure on the shell.

68. In a shaft for caissons, an inclosing shell having contiguous separable edges formed with laterally extending projections, a grooved splice plate inclosing said projections and engaging the same for resisting pressure on the shell, and means for preventing lateral movement of the splice plate with respect to the shell.

69. In a shaft for caissons, the combination of an inclosing shell having separable contiguous edges, each of the edges being bent into a longitudinal shoulder, and a splice plate extending longitudinally of and inclosing said shoulders.

70. In a shaft for caissons, the combination of an inclosing shell having separable contiguous edges each formed with a longitudinal bead, and a splice plate inclosing and engaging said beads for preventing edge-wise separation of said edges.

71. In a shaft for caissons, the combination of a casing having separable contiguous edges each provided with a lateral projection, a splice plate inclosing and engaging said projections for preventing edge-wise separation of the contiguous edges, and means for preventing lateral separation thereof.

72. In a shaft for caissons, the combination of a casing having contiguous separable edges each provided with a projection, a splice plate inclosing said projections and engaging the same for preventing edge-wise separation of the contiguous edges, and means for preventing lateral or longitudinal separation thereof.

73. In a shaft for caissons, the combination of a casing having longitudinally arranged contiguous separable edges provided with laterally extending beads, a longitudinally grooved splice plate contacting with the walls of said casing and disposed for having the beads of said edges extend into the groove of the splice plate, and means for preventing lateral movement of the splice plate relative to the casing.

74. In a caisson shaft, a plurality of sections arranged edge to edge for forming a casing, each of said sections being provided at its edges with projections, splicing plates engaging said projections for preventing edge-wise separation of the sections, and means for preventing lateral separation of the splicing plates with respect to the sections.

75. In a collapsible air shaft, the combination with separable sections of the walls of the shaft, of splice plates engaging the contiguous edges of the sections for resisting bursting pressure from within, and means for retaining the plates in position.

76. In a shaft for caissons, the combination of a casing having contiguous separable edges, a splice plate arranged at one side of the wall of the casing and engaging said edges for preventing edge-wise separation thereof, and means engaging said splice plate and extending to the opposite side of said wall for preventing lateral separation of the splice plate with respect to the wall.

77. In a shaft for caissons, the combination with a casing having contiguous separable edges each provided with a projection, of a recessed splice plate formed with shoulders in position for inclosing said projections in position for having the projections engage the shoulders, and means extending through the wall of said casing and engaging said splice plate for retaining the same in position.

78. In a shaft for caissons, the combination of a casing having contiguous separable edges each provided with a projection, a recessed splice plate inclosing said projections for preventing edge-wise separation of the walls of the casing, a splice plate on the opposite side of the walls of the casing from the first-mentioned splice plate, and means connecting the two splice plates.

79. In a shaft for caissons, the combination of a casing having contiguous separable edges each provided with a projection, a recessed splice plate inclosing said projections for preventing edge-wise separation of the walls of the casing, a splice plate on the opposite side of the walls of the casing from the first-mentioned splice plate, and means extending through the walls of the casing connecting said splice plates.

80. In a shaft for caissons, the combination of a casing having contiguous separable edges each provided with a projection, a recessed splice plate inclosing said projections for preventing edge-wise separation of the walls of the casing, a splice plate on the opposite side of the walls from the first-mentioned splice plate, and means extending through and between said contiguous edges for connecting the said splice plates.

81. In a shaft for caissons, the combination of a casing having contiguous separable edges each provided with a projection, a recessed splice plate inclosing said projections for preventing edge-wise separation of the walls of the casing, a splice plate on the opposite side of the walls from the first-mentioned splice plate, said contiguous edges being formed with alined recesses, and connecting means extending through the alined recesses and connecting the splice plates for retaining the same in position.

82. In a shaft for caissons, the combination of a casing having contiguous separable edges each formed with a projection, a recessed splice plate inclosing said projections for preventing edge-wise separation of the walls of the casing, a splice plate on the opposite side of the walls from the first-mentioned splice plate, and detachable bolts connecting said splice plates.

83. In a shaft for caissons, the combination of a casing having contiguous separable edges extending longitudinally of the casing, a longitudinally arranged splice plate disposed at one side of the walls of the casing and connecting the contiguous edges for resisting edge-wise separation thereof, a longitudinally arranged splice plate disposed on the opposite side of the walls of the casing from the first-mentioned splice plate, a longitudinally arranged gasket disposed between the second-mentioned splice plate and the said walls, and means connecting the splice plates.

84. In a shaft, the combination of longitudinally alined shaft sections, each comprising a casing having contiguous separable edges provided with lateral projections, splice plates engaging said projections for preventing edge-wise separation of the walls of the casing, said splice plates terminating short of the length of the respective section of casing, and a splice band inclosing the contacting ends of the sections of casing and extending across the space between the contiguous ends of the splice plates.

85. In a shaft, the combination of longitudinally alined shaft sections, each comprising a casing having contiguous separable edges provided with lateral projections, splice plates engaging said projections for preventing edge-wise separation of the walls of the casings, said splice plates terminating short of the length of the respective section of casing, a splice band inclosing the contacting ends of the sections of casing and extending across the space between the contiguous ends of the splice plates, and means connecting the band to the ends of the sections.

86. In a shaft, the combination of longitudinally alined shaft sections, each comprising a casing having contiguous separable edges, splice plates detachably connecting said edges and terminating short of the length of the sections, and a splice band inclosing the contacting ends of the sections.

87. In a shaft for caissons, the combination of longitudinally alined shaft sections, each comprising a casing having contiguous separable edges, splice plates detachably connecting said edges and terminating short of the length of the sections, a splice band inclosing the contacting ends of the sections, and means connecting said band to said ends.

88. In a shaft for caissons, the combination of longitudinally alined shaft sections, each comprising a casing having contiguous separable edges, splice plates detachably connecting said edges and terminating short of the length of the sections, a splice band lying across and extending about the contacting ends of the sections, a second splice band arranged on the opposite side of the walls from the first-mentioned splice band and extending about and lying across the said ends of the sections, and means connecting said splice bands.

89. In a shaft for caissons, the combination of longitudinally alined shaft sections, each comprising a casing having contiguous separable edges, splice plates detachably connecting said edges and terminating short of the length of the sections, inner and outer splice bands extending about and lying across the contacting ends of the sections, a band gasket interposed between one of said splice bands and the walls of the sections, and means connecting said splice bands.

90. In a shaft for caissons, the combination of a casing having longitudinal, contiguous, separable edges formed with outwardly turned portions, a longitudinally arranged splice plate outside the casing and formed with a groove into which said outwardly turned portions extend, the shoulders of the splice plate produced by said groove engaging said outwardly turned portions, an interior splice plate extending longitudinally of the contiguous edges, and bolts detachably connecting the said splice plates.

91. In an air lock, the combination with a lock section, of a door therefor, a rock shaft carrying said door journaled at one end in the wall of the lock section, a bearing plate surrounding said end of said shaft and fixed to the wall of the lock section, a gland box fixed to each of said bearing plates, a gasket interposed between said bearing plates and gland box, a bushing surrounding the shaft and extending through the said wall, bearing plate and gland box, said gland box being provided with an inwardly projecting, annular, externally threaded portion having an internal, annular recess, a nut surrounding the shaft and threaded onto said externally threaded portion of the gland box and formed with an outwardly projecting boss extending into the recess of the gland box, and a gasket interposed between the outer edge of said boss and the inner edge of said bushing.

92. A door for the air shaft of a caisson, comprising planks secured together, drift bolts for stiffening the door, and eyes formed on some of said drift bolts and adapted to engage supporting rods for the door.

93. A door for the air shaft of a caisson, comprising planks attached together, drift bolts for stiffening the same, eyes formed on some of said drift bolts and adapted to engage supporting means, and means for sustaining the opposite portion of the door from that sustained by said eyes.

94. In a caisson, the combination with a working chamber having an opening through its roof, of guide rods arranged at the sides of the opening, and a door slidingly mounted on said guide rods and adapted to be slid thereon to and from a position closing said opening.

95. In a caisson, the combination with a working chamber having an opening in its roof, of guide rods suspended from the roof at the sides of the opening, and a door slidingly mounted on said rods and adapted to be slid thereon to and from a position closing said opening.

96. In a caisson, the combination with a working chamber having an opening in its roof, of parallel guide rods arranged within the working chamber, a door arranged within the working chamber and eyes fixed to the door and surrounding said rods for slidingly supporting said door in position for being slid across the opening in the roof.

97. In a caisson, the combination with a shaft, and an air lock therefor, of a collapsible hopper detachably mounted within the air lock.

98. In a caisson, the combination with a shaft having an air lock, of a downwardly tapering hopper detachably mounted in the upper section of said lock.

99. In a caisson, the combination with a shaft having an air lock formed with upper and lower sections, and a door for the lower section, of a downwardly tapering hopper detachably mounted within the upper section and having its lower end terminating immediately above the door for the lower section.

100. In a caisson, the combination with a shaft having an air lock, of a downwardly tapering open-ended hopper detachably mounted within said lock, and a door for the lock disposed, when closed, to constitute a floor for the hopper.

101. In a caisson, the combination with a shaft having an air lock, of a hopper arranged therein, and flanged brackets secured to the hopper and projecting laterally therefrom in position for detachably supporting said hopper.

102. In a caisson, an air shaft comprising a casing having contiguous separable edges, and a splice plate detachably engaging said casing for preventing separation of the edges, said splice plate being tapered transversely and being positioned for being embedded in concrete surrounding the casing.

103. In an air lock, the combination with a lock section having an opening, of a rock shaft, a door fixed to said shaft and adapted to be swung to and from a position closing said opening when the shaft is rocked, an arm fixed to the shaft and extending therefrom substantially on the opposite side from the door, and a counterbalance weight pendent from said arm.

104. In an air lock, the combination with a lock section having an opening, of a rock shaft, a door fixed to said shaft and adapted to be swung to and from a position closing said opening when the shaft is rocked, an arm fixed to the shaft and extending therefrom substantially on the opposite side from the door, and a weight connected to said arm beneath the same.

In testimony whereof I affix my signature in presence of two witnesses.

OLIVER CROMWELL EDWARDS, JR.

Witnesses:
HENRY COLVIN,
W. J. BENNETT.

---

Copies of this patent may be obtained for five cents each, by addressing the "Commissioner of Patents, Washington, D. C."